US012671279B2

(12) United States Patent
Kakuki et al.

(10) Patent No.: US 12,671,279 B2
(45) Date of Patent: Jun. 30, 2026

(54) LAMINATED CORE, DYNAMO-ELECTRIC MACHINE, METHOD FOR PRODUCING LAMINATED CORE, AND METHOD FOR PRODUCING DYNAMO-ELECTRIC MACHINE

(71) Applicant: Mitsubishi Electric Corporation, Tokyo (JP)

(72) Inventors: Ryosuke Kakuki, Tokyo (JP); Satoru Sodeoka, Tokyo (JP); Tatsuro Hino, Tokyo (JP); Satoshi Yamashiro, Tokyo (JP); Homare Takeda, Tokyo (JP); Atsuya Takasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 212 days.

(21) Appl. No.: 18/694,334

(22) PCT Filed: Dec. 14, 2022

(86) PCT No.: PCT/JP2022/046062
§ 371 (c)(1),
(2) Date: Mar. 21, 2024

(87) PCT Pub. No.: WO2023/145286
PCT Pub. Date: Aug. 3, 2023

(65) Prior Publication Data
US 2024/0405615 A1     Dec. 5, 2024

(30) Foreign Application Priority Data
Jan. 27, 2022     (JP) ................................. 2022-010600

(51) Int. Cl.
*H02K 1/14*     (2006.01)
*H02K 15/02*     (2006.01)

(52) U.S. Cl.
CPC ............. *H02K 1/148* (2013.01); *H02K 15/02* (2013.01); *H02K 2201/09* (2013.01); *H02K 2215/00* (2021.08)

(58) Field of Classification Search
CPC .... H02K 1/148; H02K 15/02; H02K 2215/00; H02K 2201/09
See application file for complete search history.

(56) References Cited

U.S. PATENT DOCUMENTS

2012/0153769 A1   6/2012  Yoshida et al.
2022/0209593 A1*  6/2022  Kinoshita .............. H02K 1/148

FOREIGN PATENT DOCUMENTS

JP       S5150401 A      5/1976
JP       S5414302 U      1/1979
(Continued)

OTHER PUBLICATIONS

English translation of JP-2012135107-A (Year: 2012).*
(Continued)

*Primary Examiner* — Sean Gugger
(74) *Attorney, Agent, or Firm* — BUCHANAN, INGERSOLL & ROONEY PC

(57)     ABSTRACT

A stacked core is formed by stacking a plurality of first core sheets and second core sheets stamped from an electromagnetic steel sheet. Each first core sheet is formed such that a sheet thickness thereof increases from one side toward another side. Each second core sheet is formed such that a sheet thickness thereof increases from the other side toward the one side. The first core sheets and the second core sheets are alternately stacked per predetermined number of sheets.

20 Claims, 30 Drawing Sheets

(56)                    References Cited

FOREIGN PATENT DOCUMENTS

| | | | | |
|---|---|---|---|---|
| JP | S60121943 | A | 6/1985 | |
| JP | H09-216020 | A | 8/1997 | |
| JP | 2007-028799 | A | 2/2007 | |
| JP | 2012135107 | A * | 7/2012 | ........... H02K 15/023 |
| JP | 2012135120 | A | 7/2012 | |
| JP | 2013226013 | A | 10/2013 | |

OTHER PUBLICATIONS

Notice of Reasons for Refusal dated Oct. 29, 2024, issued in the corresponding Japanese Patent Application No. 2023-576685, 7 pages including 5 pages of English Translation.
Notice of Reasons for Refusal dated Apr. 1, 2025, issued in the corresponding Japanese Patent Application No. 2023-576685, 8 pages including 5 pages of English Translation.
International Search Report (PCT/ISA/210) with translation and Written Opinion (PCT/ISA/237) mailed on Mar. 7, 2023, by the Japan Patent Office as the International Searching Authority for International Application No. PCT/JP2022/046062. (9 pages).

* cited by examiner

*FIG. 1*

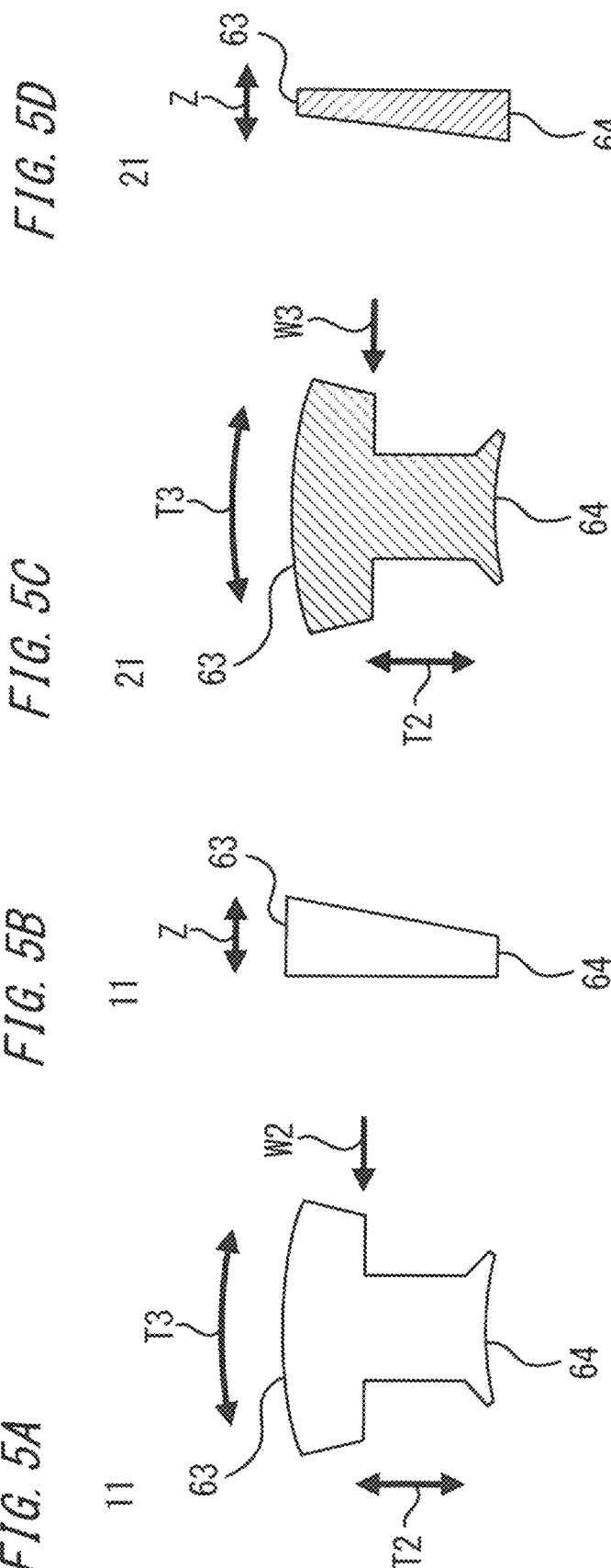

LAMINATED CORE, DYNAMO-ELECTRIC MACHINE, METHOD FOR PRODUCING LAMINATED CORE, AND METHOD FOR PRODUCING DYNAMO-ELECTRIC MACHINE

TECHNICAL FIELD

The present disclosure relates to a stacked core, a rotary electric machine, a stacked core production method, and a rotary electric machine production method.

BACKGROUND ART

In recent years, rotary electric machines such as an electric motor and an electric generator have been required to be reduced in size and increased in output. An armature core used in such a rotary electric machine is formed by a stacked core in which core sheets formed of electromagnetic steel sheets are stacked. Thus, eddy current which occurs in the armature core is suppressed to enhance efficiency, as widely known. It is also widely known that forming the armature core by integrating divided stacked cores increases the space factor of windings, to enhance efficiency.

The electromagnetic steel sheets used here for the stacked core are thin sheets rolled between rolling rolls. Therefore, in general, the sheet thicknesses thereof have biases (hereinafter, referred to as a sheet thickness deviation) depending on the characteristics and the state of the rolling rolls, and the like. As the electromagnetic steel sheets are thinned, the number of stacked sheets increases, thus causing a problem that tilt of the stacked core due to the sheet thickness deviation increases. As a measure for reducing the sheet thickness deviation, a method for dividing and overlapping electromagnetic steel sheets before stamping them is disclosed (see, for example, Patent Document 1).

CITATION LIST

Patent Document

Patent Document 1: Japanese Laid-Open Patent Publication No. 2012-135120

SUMMARY OF THE INVENTION

Problem to be Solved by the Invention

Conventionally, in a stacked core, a rotary electric machine, a stacked core production method, and a rotary electric machine production method, a step of cutting electromagnetic steel sheets and a step of overlapping them are needed before stamping, thus leading to a problem that the size of a press machine becomes large and the equipment cost increases.

The present disclosure has been made to solve the above problem, and an object of the present disclosure is to provide a stacked core, a rotary electric machine, a stacked core production method, and a rotary electric machine production method that enable stable production at low cost.

Means to Solve the Problem

A stacked core according to the present disclosure is a stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, and the first core sheets and the second core sheets are alternately stacked per predetermined number of sheets.

A rotary electric machine according to the present disclosure includes: a stator formed by arranging, in an annular shape, a plurality of the stacked cores described above; and a rotor provided so as to be opposed to the stator via an air gap.

A stacked core production method according to the present disclosure includes: a stamping step of stamping the first core sheets and the second core sheets from an electromagnetic steel sheet of which a sheet thickness differs along a sheet width direction; an alignment step of forming a core sheet set in which the first core sheets and the second core sheets are alternately stacked per predetermined number of sheets and are aligned; and a fixation step of fixing the core sheet set in a stacking direction, wherein, in the stamping step, each first core sheet and each second core sheet are stamped with their respective tooth end sides reversed from each other in the sheet width direction of the electromagnetic steel sheet, or each first core sheet and each second core sheet are stamped with their respective tooth end sides reversed from each other in a rolling direction of the electromagnetic steel sheet.

A stacked core production method according to the present disclosure is a stacked core production method for forming a stacked core by stacking a plurality of core sheets stamped from an electromagnetic steel sheet of which a sheet thickness differs along the sheet width direction, the method including: a stamping step of stamping a plurality of the core sheets at different positions in the sheet width direction of the electromagnetic steel sheet, to form a plurality of kinds of the core sheets having different sheet thicknesses; an alignment step of stacking the plurality of kinds of core sheets in a predetermined order and per predetermined number of sheets, and aligning the stacked core sheets, to form a core sheet set; and a fixation step of fixing the core sheet set in a stacking direction.

A rotary electric machine production method according to the present disclosure includes: forming a stator by arranging, in an annular shape, a plurality of the stacked cores produced by the stacked core production method described above; and providing a rotor so as to be opposed to the stator via an air gap.

Effect of the Invention

With the stacked core, the rotary electric machine, the stacked core production method, and the rotary electric machine production method according to the present disclosure, it becomes possible to provide a stacked core, a rotary electric machine, a stacked core production method, and a rotary electric machine production method that enable stable production at low cost.

BRIEF DESCRIPTION OF THE DRAWINGS

FIG. 1 is a perspective view showing the structure of a stacked core according to embodiment 1.

FIG. 4A is a plan view of an electromagnetic steel sheet and FIG. 4B shows the sheet thickness of the electromagnetic steel sheet.

FIGS. 5A-5D illustrate the method for producing the stacked core shown in FIG. 1, where FIG. 5A is a plan view showing the structure of a first core sheet, FIG. 5B shows the sheet thickness in the radial direction of the first core sheet in FIGS. 5A, FIG. 5C is a plan view showing the structure of a second core sheet, and FIG. 5D shows the sheet thickness in the radial direction of the second core sheet in FIG. 5C.

FIG. 10A is a plan view of an electromagnetic steel sheet and FIG. 10B shows the sheet thickness of the electromagnetic steel sheet.

FIG. 11A is a plan view showing the structure of a first core sheet, FIG. 11B shows the sheet thickness in the circumferential direction of the first core sheet in FIG. 11A, FIG. 11C is a plan view showing the structure of a second core sheet, and FIG. 11D shows the sheet thickness in the circumferential direction of the second core sheet in FIG. 11C.

FIG. 13A is a plan view of an electromagnetic steel sheet, FIG. 13B shows the sheet thickness of the electromagnetic steel sheet, and FIG. 13C is a side view of core sheets that are stamped and stacked.

FIG. 14A is a plan view of the electromagnetic steel sheet, FIG. 14B shows the sheet thickness of the electromagnetic steel sheet, and FIG. 14C is a side view of core sheets that are stamped and stacked.

FIG. 15A is a plan view of the electromagnetic steel sheet, FIG. 15B shows the sheet thickness of the electromagnetic steel sheet, and FIG. 15C is a side view of core sheets that are stamped and stacked.

FIG. 17 shows the structure of an alignment device for a stacked core according to embodiment 4.

DESCRIPTION OF EMBODIMENTS

Embodiment 1

Figure 1:
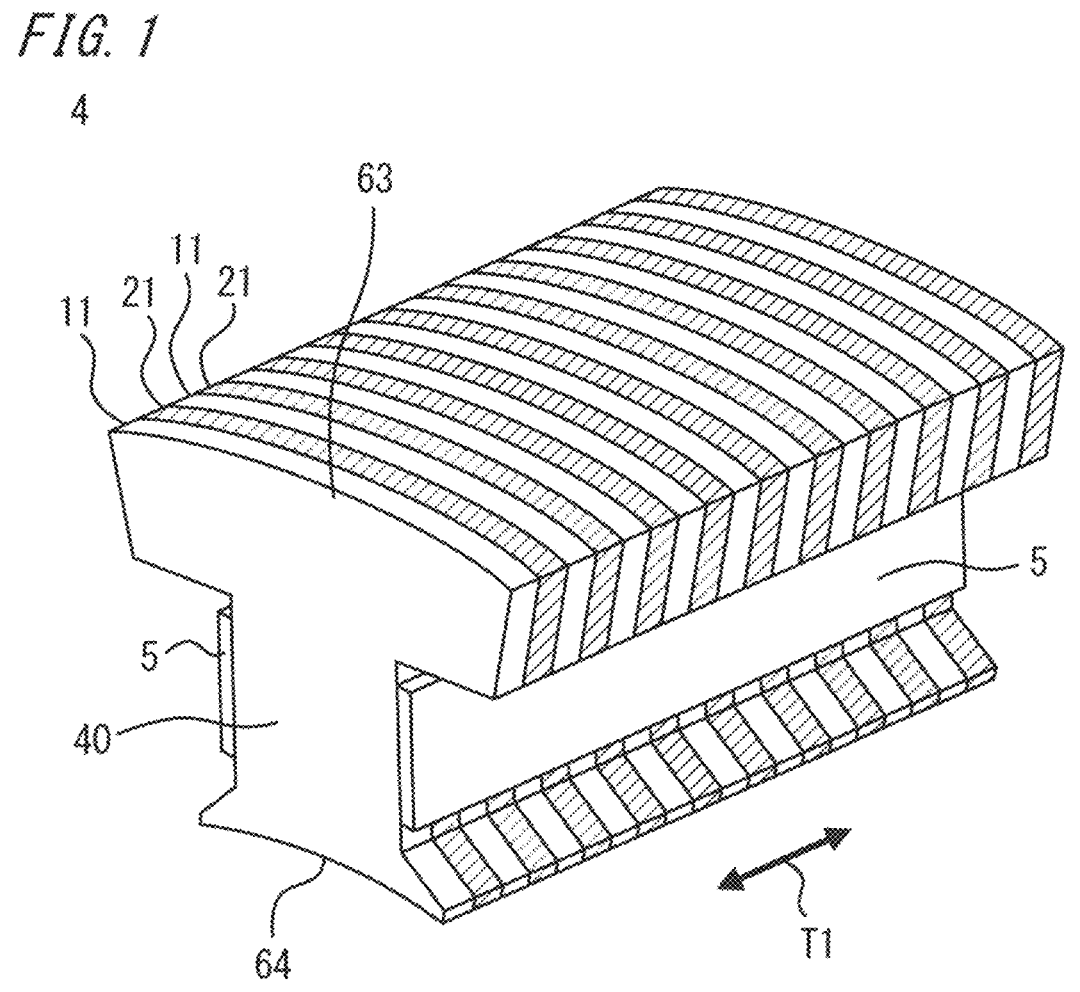
Figure 2:
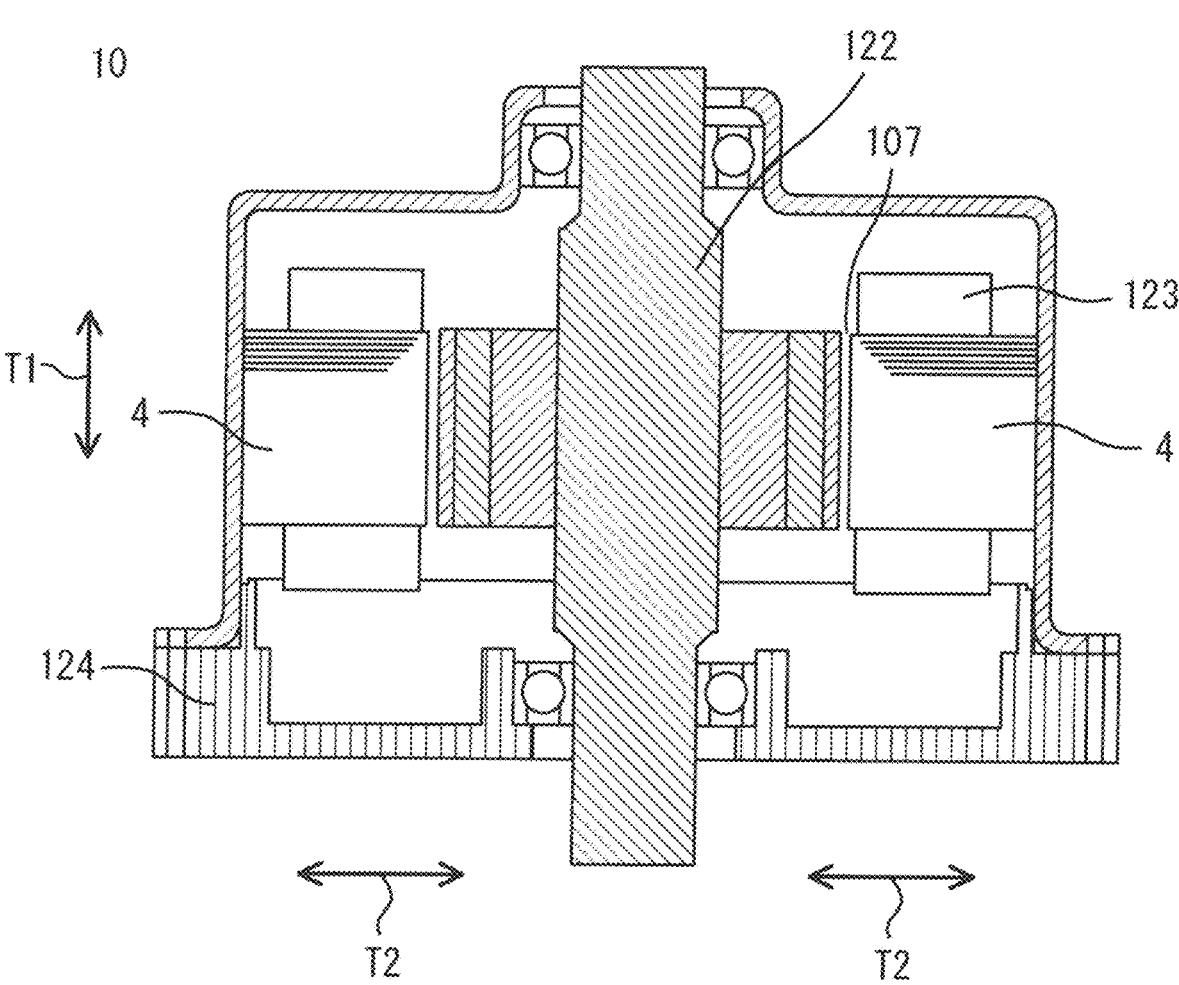
FIG. 2 is a sectional view showing the structure of a rotary electric machine having the stacked core shown in FIG. 1.
Figure 3:
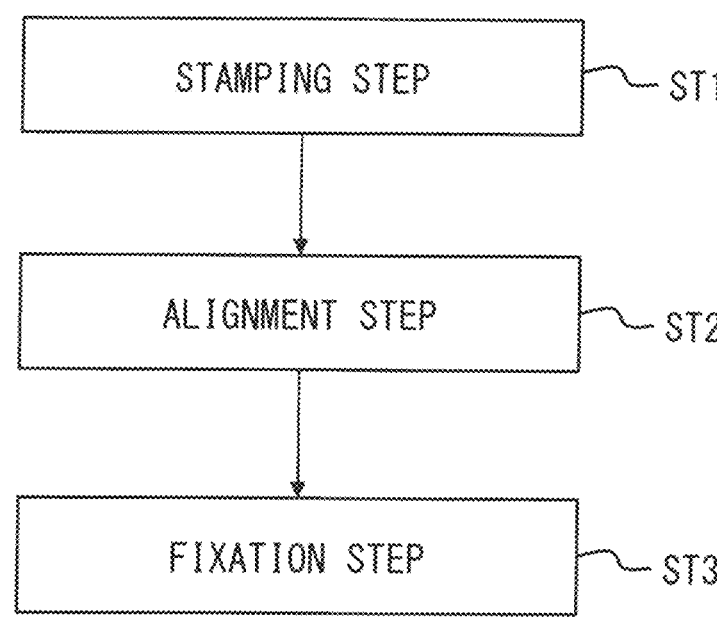
FIG. 3 is a flowchart showing a method for producing the stacked core shown in FIG. 1.
Figure 4B:
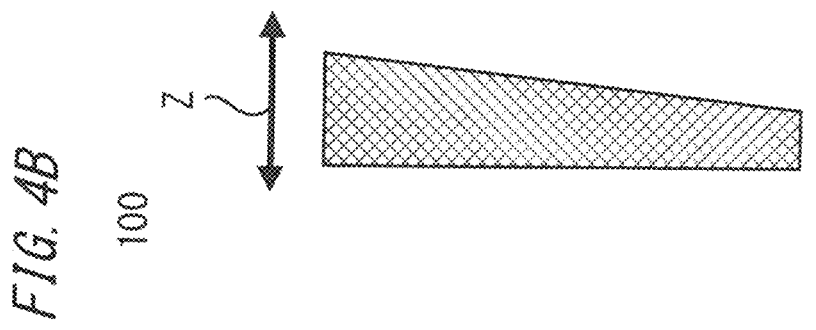
FIGS. 4A and 4B illustrate the method for producing the stacked core shown in FIG. 1, where
Figure 4A:
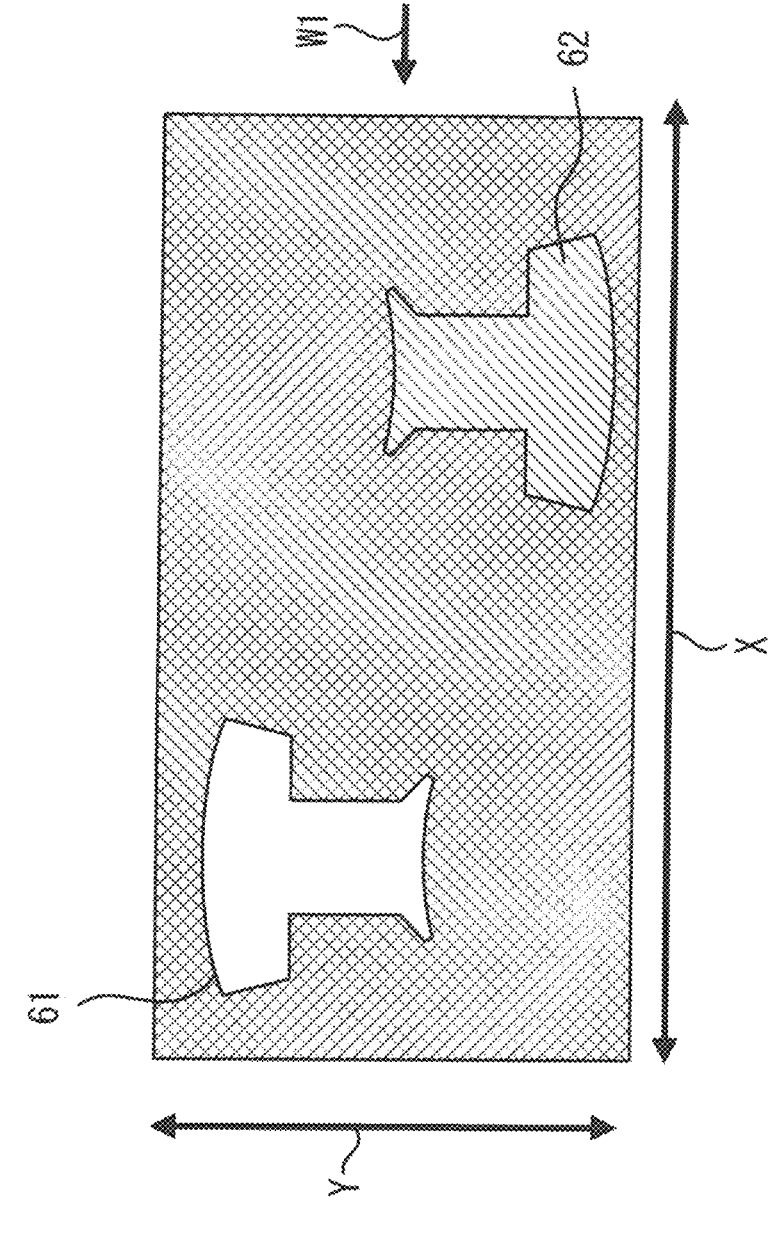

FIG. 1 is a perspective view showing the structure of a stacked core according to embodiment 1. FIG. 2 is a sectional view showing the structure of a rotary electric machine having the stacked core shown in FIG. 1. FIG. 3 is a flowchart showing a method for producing the stacked core shown in FIG. 1. FIG. 4 and FIG. 5 illustrate the method for producing the stacked core shown in FIG. 1. FIG. 4A is a plan view of an electromagnetic steel sheet, and FIG. 4B shows the sheet thickness of the electromagnetic steel sheet as seen from the direction of arrow W1 in FIG. 4A.

Figure 6:
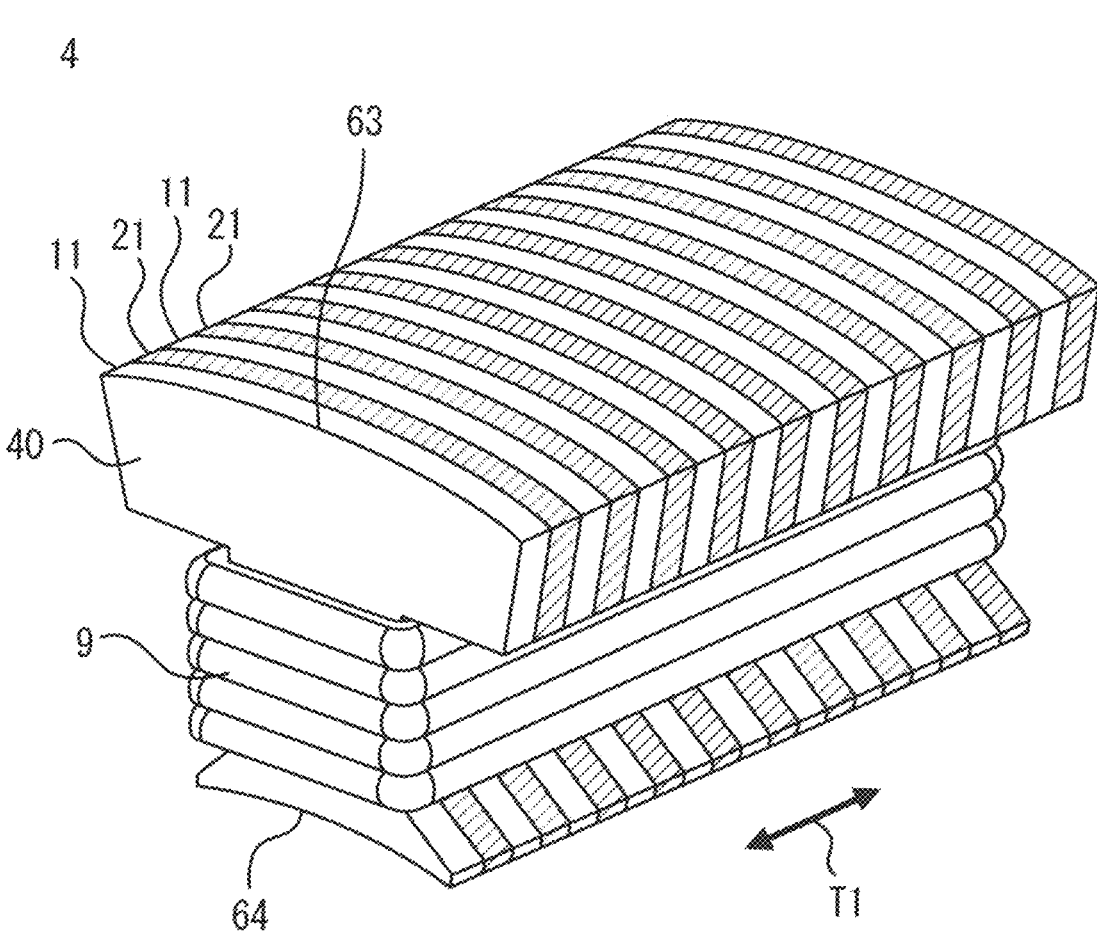
FIG. 6 is a perspective view showing a state in which a coil is provided to the stacked core shown in FIG. 1.
Figure 7:
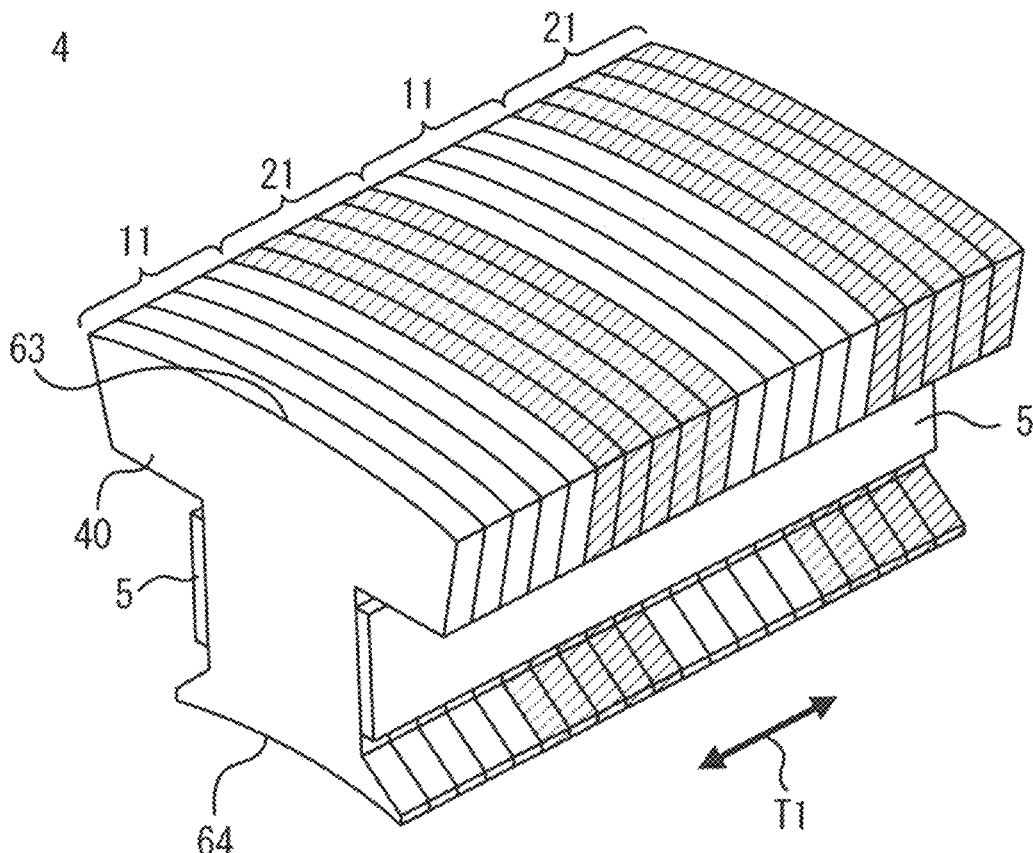
FIG. 7 is a perspective view showing the structure of another stacked core according to embodiment 1.
Figure 8:
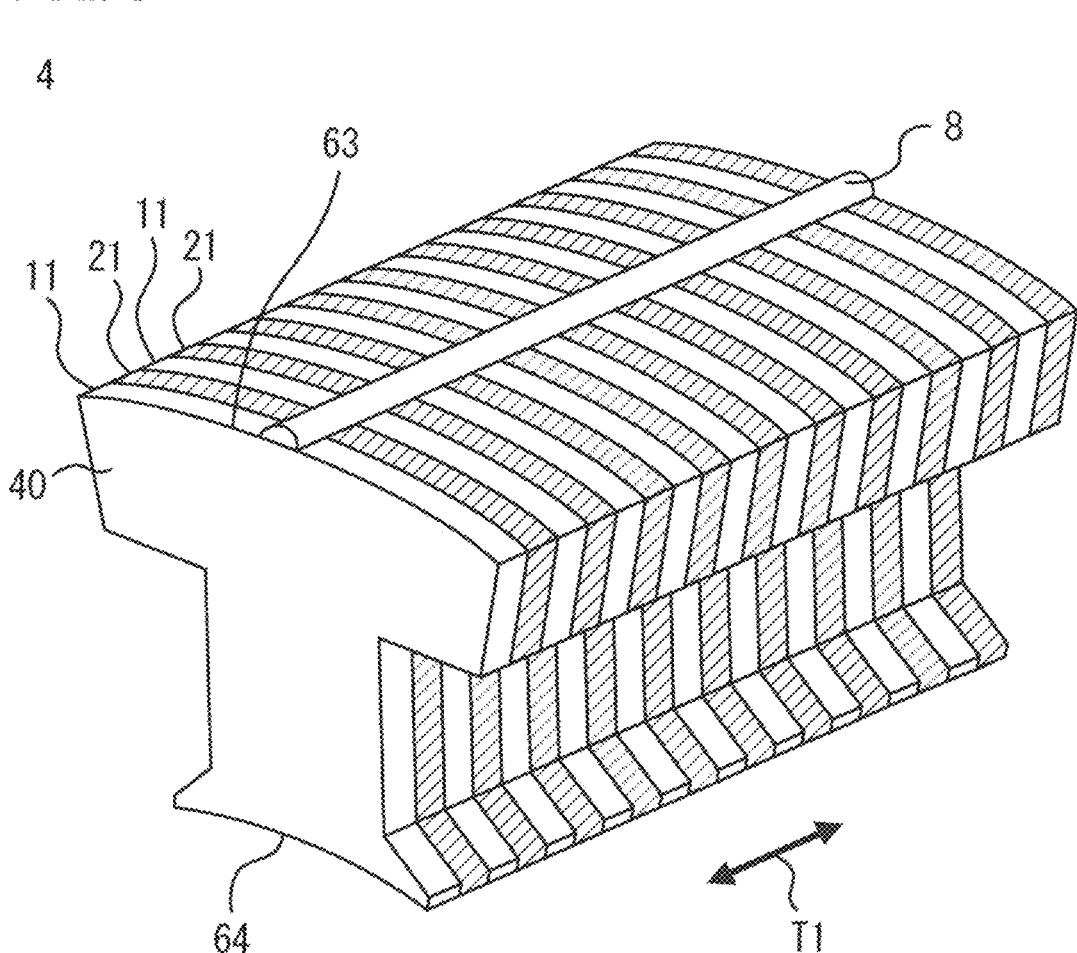
FIG. 8 is a perspective view showing the structure of another stacked core according to embodiment 1.

FIG. 5A is a plan view showing the structure of a first core sheet, and FIG. 5B shows the sheet thickness of the first core sheet in FIG. 5A as seen from the direction of arrow W2. FIG. 5C is a plan view showing the structure of a second core sheet, and FIG. 5D shows the sheet thickness of the second core sheet in FIG. 5C as seen from the direction of arrow W3. FIG. 6 is a perspective view showing a state in which a coil is provided to the stacked core shown in FIG. 1. FIG. 7 and FIG. 8 are perspective views showing the structures of other stacked cores according to embodiment 1.

In FIG. 2, a rotary electric machine 10 is composed of a rotor 122 which is a part to rotate, a stator 123 which produces a force for rotating the rotor 122, and a frame 124 storing the rotor 122 and the stator 123. The stator 123 and the rotor 122 are provided so as to be opposed to each other via an air gap 107. The stator 123 is formed such that a plurality of stacked cores 4 each provided with an insulator (not shown) and a coil 9 (see FIG. 6) are arranged in an annular shape. About the rotary electric machine 10, an axial direction T1 and a radial direction T2 are defined.

In FIG. 1, the stacked core 4 is formed by a core sheet set 40 having first core sheets 11 and second core sheets 21 alternately stacked in a stacking direction T1 and extending to a predetermined length in the stacking direction T1. The stacking direction T1 of the stacked core 4 is the same as the axial direction T1 of the rotary electric machine 10. The stacked core 4 is fixed by adhesion portions 5 formed along the stacking direction T1 over parts of side surfaces of the core sheet set 40.

The first core sheet 11 and the second core sheet 21 are formed by being stamped from an electromagnetic steel sheet 100 described later. As shown in FIG. 5, the first core sheet 11 is formed such that the sheet thickness thereof increases from one side toward another side, here, from one side toward another side in the radial direction T2, and the second core sheet 21 is formed such that the sheet thickness thereof increases from the other side toward the one side, here, from the other side toward the one side in the radial direction T2. The details of the first core sheet 11 and the second core sheet 21 will be described in description of a method for producing the stacked core 4. In FIG. 1, for convenience sake, the sheet thicknesses are shown in a constant size. Such illustration in which the sheet thicknesses are shown in a constant size for convenience sake also applies to other figures, i.e., FIG. 6, FIG. 7, and FIG. 8.

As shown in FIG. 4A, directions of the electromagnetic steel sheet 100 from which the first core sheet 11 and the second core sheet 21 are stamped are defined as a rolling direction X and a sheet width direction Y, to give description. Here, as shown in FIG. 4B, as an example, a case where there is such a sheet thickness deviation that a sheet thickness Z increases from one end side toward another end side in the sheet width direction Y of the electromagnetic steel sheet 100, will be described. The electromagnetic steel sheet 100 is a thin sheet rolled between rolling rolls. In general, the thin sheet is a very thin sheet having a thickness not greater than 0.5 mm.

Because of such a thin sheet, it is general that a sheet thickness deviation occurs in the sheet thickness Z along the sheet width direction Y, depending on the characteristics and the state of the rolling rolls, and the like. The above directions and sheet thickness deviation hereafter apply in the same manner and the description thereof will be omitted as appropriate. Various examples are conceivable for the sheet thickness deviation, but for convenience of description, the above example is used in description. In the drawings, the sheet thickness Z is shown in an exaggerated manner so as to clarify the sheet thickness Z.

Next, a method for producing the stacked core and the rotary electric machine in embodiment 1 configured as described above will be described. First, by press work, at different positions in the sheet width direction Y on the electromagnetic steel sheet 100 having the sheet thickness deviation as shown in FIG. 4A, a first core sheet 11 is stamped at a first position 61 and a second core sheet 21 is stamped at a second position 62 such that tooth end sides 64 of the first core sheet 11 and the second core sheet 21 are reversed from each other in the sheet width direction Y (stamping step ST1 in FIG. 3).

The first core sheet 11 stamped at the first position 61 is formed as shown in FIG. 5A. As shown in FIG. 5B, the first core sheet 11 is formed such that the sheet thickness Z thereof increases from the tooth end side 64 toward a core back side 63. That is, the first core sheet 11 is formed such that the sheet thickness Z thereof increases from the one side in the radial direction T2 of the rotary electric machine 10, here, the tooth end side 64, toward the other side, here, the core back side 63.

On the other hand, the second core sheet 21 stamped at the second position 62 so as to have the tooth end side 64 reversed from the tooth end side 64 of the first core sheet 11 is formed as shown in FIG. 5C. As shown in FIG. 5D, the second core sheet 21 is formed such that the sheet thickness Z thereof increases from the core back side 63 toward the tooth end side 64. That is, the second core sheet 21 is formed such that the sheet thickness Z thereof increases from the other side in the radial direction T2 of the rotary electric machine 10, here, the core back side 63, toward the one side, here, the tooth end side 64. The radial direction T2 shown in FIG. 5 is a radial direction at the center position in a circumferential direction T3 of each core sheet 11, 21.

If only the first core sheets 11 (or only the second core sheets 21) formed as described above are stacked, thickness differences between the core back side and the tooth end side in the radial direction of the rotary electric machine are accumulated, so that the obtained stacked core has a shape curved and tilted in the core radial direction as seen from a side surface of the stacked core. This phenomenon amplifies in proportion to the number of stacked core sheets. Therefore, as the stacking thickness of the stacked core increases or as the sheet thickness of each electromagnetic steel sheet decreases, the number of stacked thin core sheets forming the stacked core increases, so that the above phenomenon occurs more significantly.

Then, in a case of producing a rotary electric machine using such a tilted stacked core, the air gap between stacked core and the rotor becomes non-uniform, so that magnetic attraction forces based on a rotation angle vary, thus deteriorating motor performance. Further, at the time of attaching an insulator and a coil to the stacked core, and at the time of attaching a stator to a frame, they are highly likely to interfere with a jig and a device, thus deteriorating productivity in producing the rotary electric machine.

In this regard, in the present embodiment 1, as shown in FIG. 5, two kinds of core sheets, i.e., the first core sheets 11 and the second core sheets 21 of which the tendencies of the sheet thicknesses Z between the core back side 63 and the tooth end side 64 are opposite to each other, are alternately stacked one by one, to form the core sheet set 40 (alignment step ST2 in FIG. 3). Therefore, in the stacked core 4, differences between the sheet thicknesses Z of the first core sheets 11 and the second core sheets 21 are not accumulated. Thus, a difference between the dimensions in the stacking direction T1 on the core back side 63 and the tooth end side 64 of the stacked core 4 is reduced, whereby the degree of tilt of the stacked core 4 can be reduced and motor performance of the produced rotary electric machine 10 can be improved. In view of the nature of rolling work, there is almost no deviation in the sheet thickness in the rolling direction X, and therefore, regarding the stamping positions of the core sheets 11, 21, the influence due to positions in the rolling direction X is sufficiently small as compared to that in the sheet width direction Y.

Next, in order to fix the aligned and stacked first core sheets 11 and second core sheets 21 of the stacked core 4, parts of side surfaces of the first core sheets 11 and the second core sheets 21 are adhered by an adhesive, to form the adhesion portions 5 for fixing them (fixation step ST3 in FIG. 3).

In general, as a method for fixing stacked core sheets, there is a method of interlocking the core sheets with each other in the axial direction. In this method, the electromagnetic steel sheets are electrically short-circuited therebetween in the stacking direction at the fixed part, so that eddy current occurs, thus causing a problem of deteriorating efficiency. In addition, residual stress occurs at the interlocked part, so that hysteresis loss increases, thus causing a problem of deteriorating efficiency of the rotary electric machine.

In this regard, as shown in FIG. 1, since the stacked core 4 is fixed by the adhesion portions 5, there is no electric short-circuit and residual stress is reduced, whereby the stacked core 4 having high efficiency can be obtained. Next, as shown in FIG. 6, the coil 9 is formed on the stacked core 4. Next, in the frame 124, the stator 123 formed such that a plurality of the stacked cores 4 having the coils 9 are arranged in an annular shape is provided, and the rotor 122 is provided so as to be opposed thereto via the air gap 107, thus forming the rotary electric machine 10 (FIG. 2).

In the stacked core 4 shown in the above embodiment 1, as shown in FIG. 1, the first core sheets 11 and the second core sheets 21 are alternately stacked one by one in the stacking direction T1, as an example. However, without limitation thereto, for example, as shown in FIG. 7, the first core sheets 11 and the second core sheets 21 may be alternately stacked per predetermined plural number of sheets in the stacking direction T1 (in FIG. 7, they are stacked five by five as an example), and also in this case, the stacked core 4 and the rotary electric machine 10 can be formed in the same manner as in the above embodiment 1. On the basis of information such as a cycle time of a device for producing the stacked core 4 or a profile of the sheet thickness deviation of the electromagnetic steel sheet 100, the optimum numbers of sheets to be stacked for the first core sheets 11 and the second core sheets 21 may be selected as appropriate, to form the stacked core 4.

The stacked core 4 shown in the above embodiment 1 is fixed by forming the adhesion portions 5 using an adhesive in the fixation step ST3 as shown in FIG. 1, as an example. However, without limitation thereto, for example, as shown in FIG. 8, the aligned and stacked first core sheets 11 and second core sheets 21 of the stacked core 4 may be fixed by welding a part of a side surface of the first core sheets 11 and the second core sheets 21 so as to form a welded portion 8, and also in this case, the stacked core 4 and the rotary electric machine 10 can be formed in the same manner as in the above embodiment 1. As in a case of interlocking, there is a problem that the electromagnetic steel sheets are short-circuited in the stacking direction at the welded part, eddy current occurs, and efficiency is deteriorated. However, as compared to the adhesion portions, the welding portion can increase the fixation strength and therefore is effective means in a case of needing strong fixation between stacked sheets.

In the above embodiment 1, the case of performing the fixation step ST3 after the alignment step ST2 has been shown. However, the alignment step ST2 and the fixation step ST3 may be performed at the same time. For example, in stamping the core sheets 11, 21 from the electromagnetic steel sheet 100, interlocking parts are formed and the stacked sheets are pressed to each other, whereby the stacked sheets can be fixed by interlocking while the core sheets 11, 21 are aligned.

In this way, the alignment step ST2 and the fixation step ST3 are unified and the production process is shortened, so that the production cost for the stacked core 4 and the rotary electric machine 10 is reduced. Instead of interlocking, an adhesive may be applied or sprayed between the stacked sheets and the stacked sheets may be pressed to each other, to fix the stacked sheets. In this way, it is possible to obtain a stacked core having high efficiency while solving such a problem that electromagnetic steel sheets are short-circuited in the stacking direction, eddy current occurs, and efficiency is deteriorated as described in fixation by interlocking.

In the above embodiment 1, the case of forming the adhesion portions 5 or the welded portion 8 in the fixation step ST3 has been shown as an example. However, without limitation thereto, in production, the adhesion portions or the welded portion may not be formed and placing the coil 9 as shown in FIG. 6 may be regarded as the fixation step ST3 for fixing the stacked core.

The stacked core according to embodiment 1 configured as described above is a stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, and the first core sheets and the second core sheets are alternately stacked per predetermined number of sheets.

The rotary electric machine according to embodiment 1 configured as described above includes:

a stator formed by arranging a plurality of the stacked cores described above in an annular shape; and a rotor provided so as to be opposed to the stator via an air gap.

Thus, dimension differences in the stacking direction caused when the first core sheets and the second core sheets are stacked are reduced without being accumulated, whereby it is possible to provide a stacked core that is less tilted and has a stable posture.

That is, it is possible to stably provide a stacked core that is less tilted, using inexpensive equipment, while minimizing the influence of a sheet thickness deviation even though a large number of first core sheets and second core sheets are stacked.

Thus, the air gap between the rotor and the stator formed using the stacked core is uniformed, whereby variation in magnetic attraction forces due to the rotation angle is suppressed and motor performance is improved.

At the time of attaching an insulator and a coil to the stacked core, and at the time of attaching the stacked core to a frame, they are less likely to interfere with a jig and a device, thus improving productivity of the rotary electric machine.

Further, in the stacked core according to embodiment 1, each first core sheet is formed such that the sheet thickness thereof increases from the one side toward the other side in a radial direction of a rotary electric machine, and each second core sheet is formed such that the sheet thickness thereof increases from the other side toward the one side in the radial direction of the rotary electric machine.

Further, the stacked core production method according to embodiment 1 configured as described above includes:

a stamping step of stamping the first core sheets and the second core sheets from an electromagnetic steel sheet of which a sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, wherein in the stamping step, each first core sheet and each second core sheet are stamped with their respective tooth end sides reversed from each other in the sheet width direction of the electromagnetic steel sheet.

Thus, the first core sheets of which the sheet thicknesses increase from the one side toward the other side, and the second core sheets of which the sheet thicknesses increase from the other side toward the one side, can be assuredly formed.

Further, yield of the electromagnetic steel sheet can be improved.

Further, in the stacked core production method according to embodiment 1, in the fixation step, a part of a side surface along the stacking direction of the core sheet set is adhered by an adhesive, to form an adhesion portion.

Thus, electric short-circuit does not occur and residual stress can be reduced, whereby it is possible to provide a stacked core and a rotary electric machine that have high efficiency while suppressing occurrence of eddy current and reducing hysteresis loss.

Further, in the stacked core production method according to embodiment 1, in the fixation step, a part along the stacking direction of the core sheet set is welded to form a welded portion.

Thus, it is possible to provide a stacked core and a rotary electric machine in which stacked sheets are strongly fixed.

Further, in the stacked core production method according to embodiment 1, in the fixation step, the core sheet set is fixed by winding a coil around the core sheet set.

Thus, since fixation of the stacked core is made by provision of the coil, a production process can be shortened.

Embodiment 2

In the above embodiment 1, as an example, the first core sheet 11 is formed such that the sheet thickness Z thereof increases from the one side (tooth end side 64) toward the other side (core back side 63) in the radial direction T2 of the rotary electric machine 10, and the second core sheet 21 is formed such that the sheet thickness Z thereof increases from the other side (core back side 63) toward the one side (tooth end side 64) in the radial direction T2 of the rotary electric machine 10. However, without limitation thereto, it suffices that the first core sheet is formed such that the sheet thickness thereof increases from one side toward another side and the second core sheet is formed such that the sheet thickness thereof increases from the other side toward the one side. In the present embodiment 2, another example will be described. The matters other than the sheet thicknesses are the same as in the above embodiment 1 and therefore the description thereof is omitted as appropriate.

Figure 9:
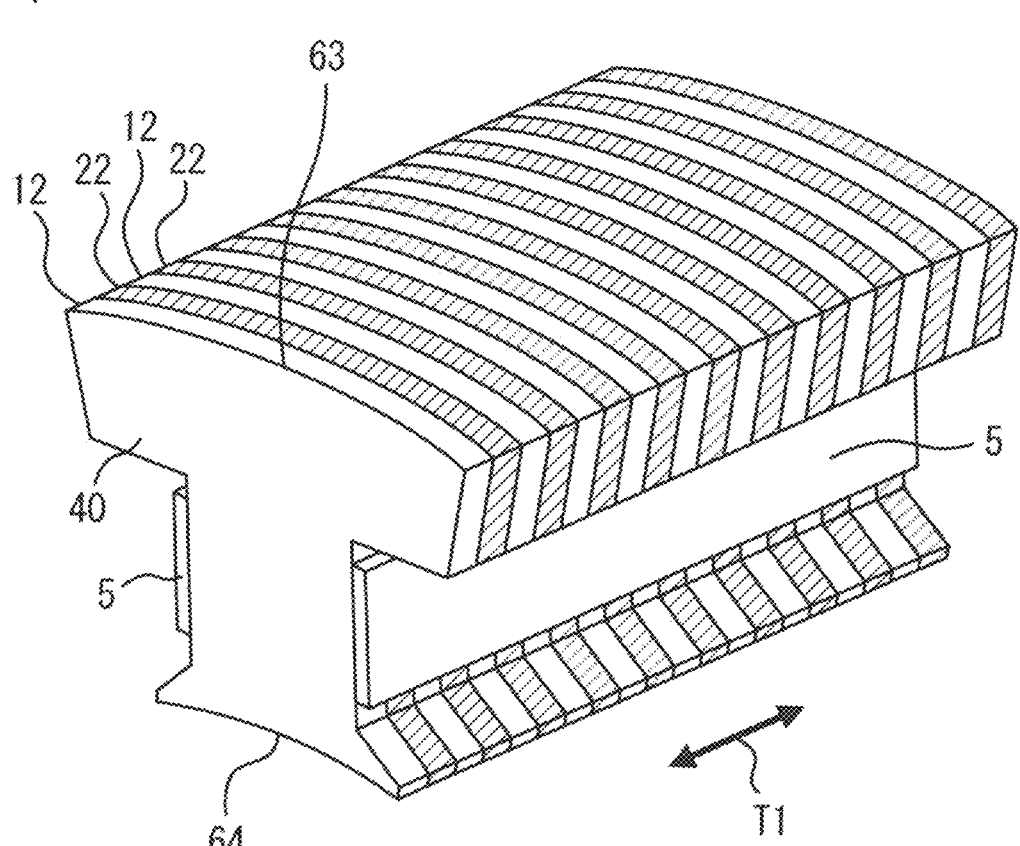
FIG. 9 is a perspective view showing the structure of a stacked core according to embodiment 2.
Figure 10B:
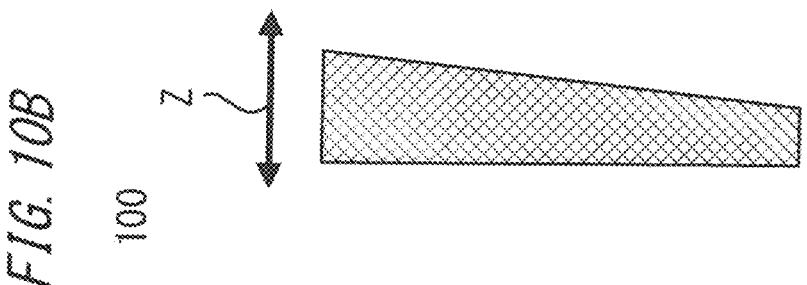
FIGS. 10A and 10B illustrates a method for producing the stacked core shown in FIG. 9, where
Figure 10A:
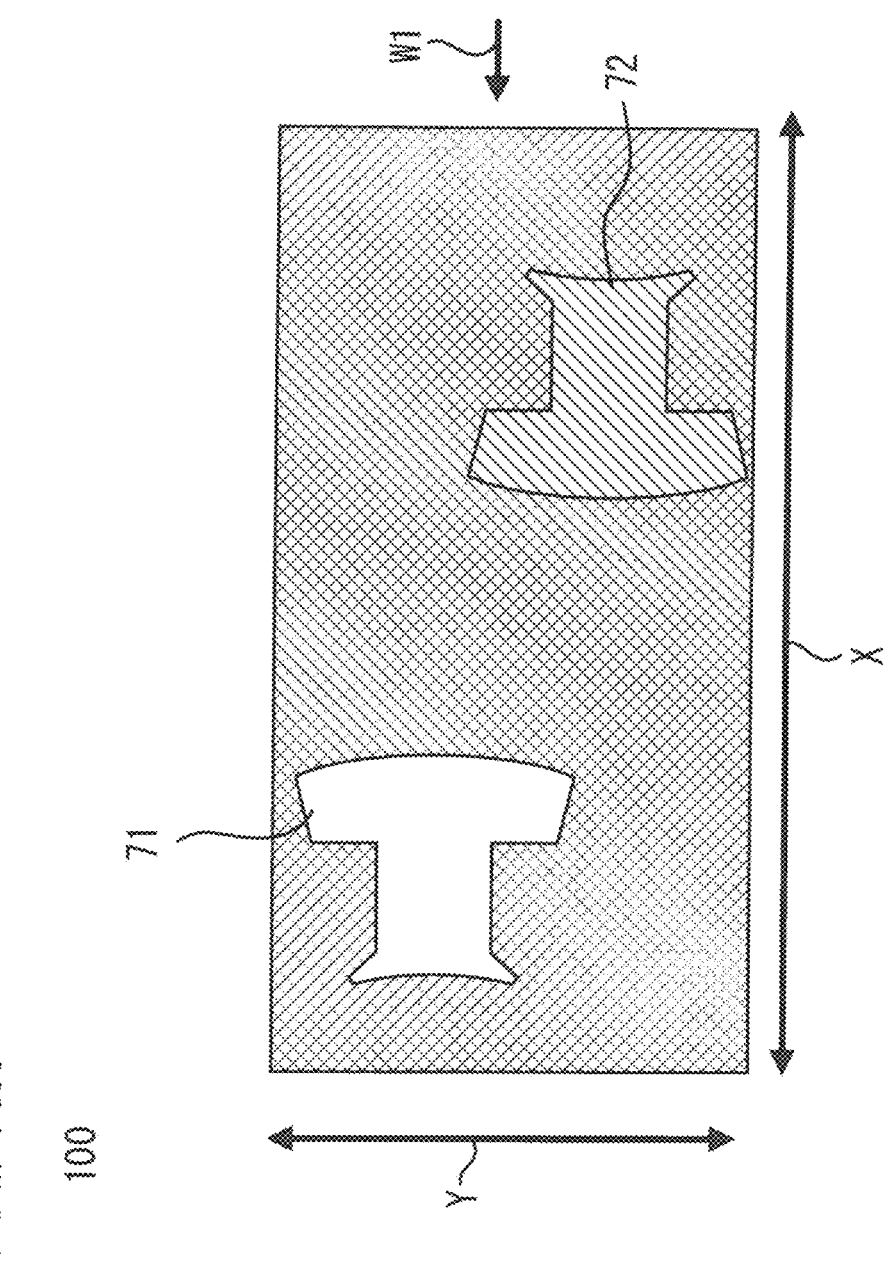
Figure 11A:
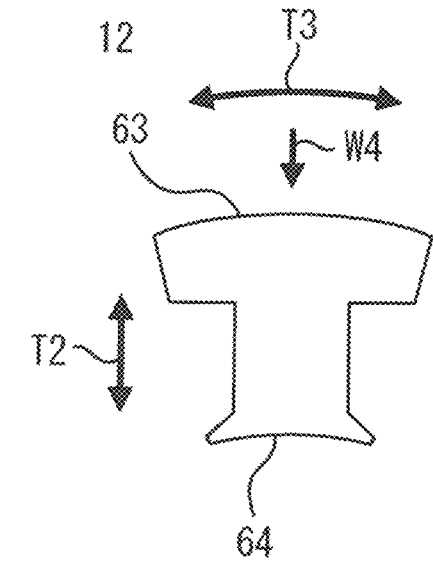
FIGS. 11A-11D illustrates the method for producing the stacked core shown in FIG. 9, where
Figure 11B:
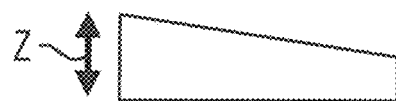
Figure 11C:
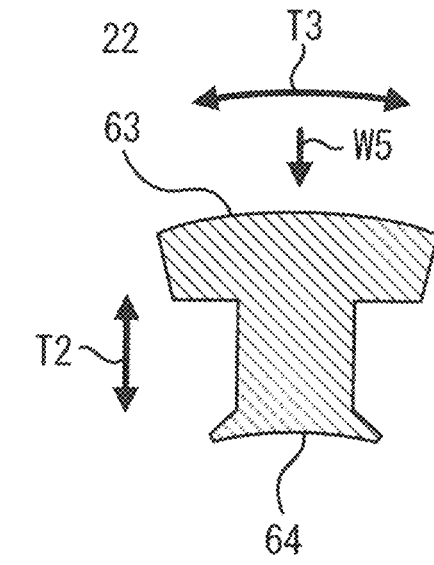
Figure 11D:
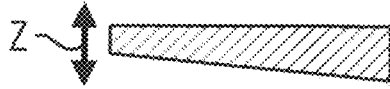

FIG. 9 is a perspective view showing the structure of a stacked core according to embodiment 2. FIG. 10 and FIG. 11 illustrate a method for producing the stacked core shown in FIG. 9. FIG. 10A is a plan view of an electromagnetic steel sheet, and FIG. 10B shows the sheet thickness of the electromagnetic steel sheet as seen from the direction of arrow W1 in FIG. 10A. FIG. 11A is a plan view showing the structure of a first core sheet, and FIG. 11B shows the sheet thickness of the first core sheet in FIG. 11A as seen from the direction of arrow W4. FIG. 11C is a plan view showing the structure of a second core sheet, and FIG. 11D shows the sheet thickness of the second core sheet in FIG. 11B as seen from the direction of arrow W5. In the drawings, the same parts as those in the above embodiment 1 are denoted by the same reference characters and description thereof is omitted. In FIG. 9, for convenience sake, the sheet thicknesses are shown in a constant size.

In the present embodiment 2, as in the above embodiment 1, by press work, at different positions in the sheet width direction Y on the electromagnetic steel sheet 100 having the sheet thickness deviation as shown in FIG. 10A, a first core sheet 12 is stamped at a first position 71 and a second core sheet 22 is stamped at a second position 72 such that the tooth end sides 64 of the first core sheet 12 and the second core sheet 22 are reversed from each other in the rolling direction X.

The first core sheet 12 stamped at the first position 71 is formed as shown in FIG. 11A. As shown in FIG. 11B, the first core sheet 12 is formed such that the sheet thickness Z thereof increases from one side toward another side in the circumferential direction T3. On the other hand, the second core sheet 22 stamped at the second position 72 so as to have the tooth end side 64 reversed from the tooth end side 64 of the first core sheet 12 is formed as shown in FIG. 11C. As shown in FIG. 11D, the second core sheet 22 is formed such that the sheet thickness Z thereof increases from the other side toward the one side in the circumferential direction T3.

The first core sheet 12 formed as described above has a sheet thickness increasing from the one side toward the other side, and the second core sheet 22 formed as described above has a sheet thickness increasing from the other side toward the one side. The radial direction T2 shown in FIG. 11 is a radial direction at the center position in the circumferential direction T3 of each core sheet 11, 21. As shown in FIG. 9, the stacked core 4 is formed such that the first core sheets 12 and the second core sheets 22 are alternately stacked one by one in the stacking direction T1.

Accordingly, the first core sheets 12 of which the sheet thicknesses Z increase toward one side in the circumferential direction T3, and the second core sheet 22 of which the sheet thicknesses Z increase toward another side in the circumferential direction T3, i.e., the sheet thicknesses Z decrease toward the one side in the circumferential direction T3, are stacked in the stacking direction T1, so that differences between the sheet thicknesses Z of the first core sheets 12 and the second core sheets 22 are not accumulated. Thus, by combining the stamping positions of the first core sheet 12 and the second core sheet 22 appropriately, as in the above embodiment 1, a dimension difference in the stacking direction T1 due to the sheet thickness deviation is reduced in the stacked core 4, whereby it is possible to form the stacked core 4 and the rotary electric machine 10 that are less tilted and have stable postures.

In the stacked core according to embodiment 2 configured as described above, the same effects as in the above embodiment 1 are provided, and in addition, each first core sheet is formed such that the sheet thickness thereof increases from the one side toward the other side in a circumferential direction of a rotary electric machine, and each second core sheet is formed such that the sheet thickness thereof increases from the other side toward the one side in the circumferential direction of the rotary electric machine.

Further, the stacked core production method according to embodiment 2 configured as described above includes:

a stamping step of stamping the first core sheets and the second core sheets from an electromagnetic steel sheet of which a sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, wherein in the stamping step, each first core sheet and each second core sheet are stamped with their respective tooth end sides reversed from each other in a rolling direction of the electromagnetic steel sheet.

Thus, the first core sheets of which the sheet thicknesses increase from the one side toward the other side, and the second core sheets of which the sheet thicknesses increase from the other side toward the one side, can be assuredly formed.

Further, yield of the electromagnetic steel sheet can be improved.

Embodiment 3

In the above embodiments, a method for stacking the first core sheets 11, 12 and the second core sheets 21, 22 after stamping has not been shown specifically. In the present embodiment 3, the stacking method will be described. The other matters are the same as in the above embodiments and therefore the description thereof is omitted as appropriate. In the present embodiment 3, description will be given using the first core sheets 11 and the second core sheets 21 as an example.

Figure 20:
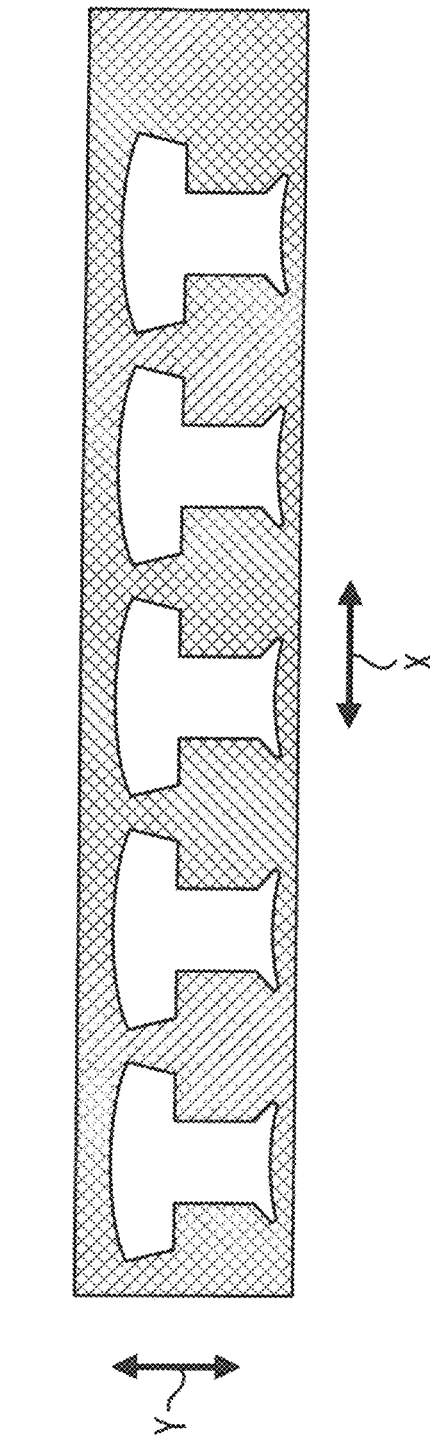
FIG. 20 shows a stacked core production method in a comparative example.

In general, the first core sheets 11 and the second core sheets 21 have complicated shapes. Therefore, for example, as in a comparative example shown in FIG. 20, when core sheets are stamped, an area where core sheets are not stamped is large, so that material yield of an electromagnetic steel sheet is deteriorated.

Figure 12:
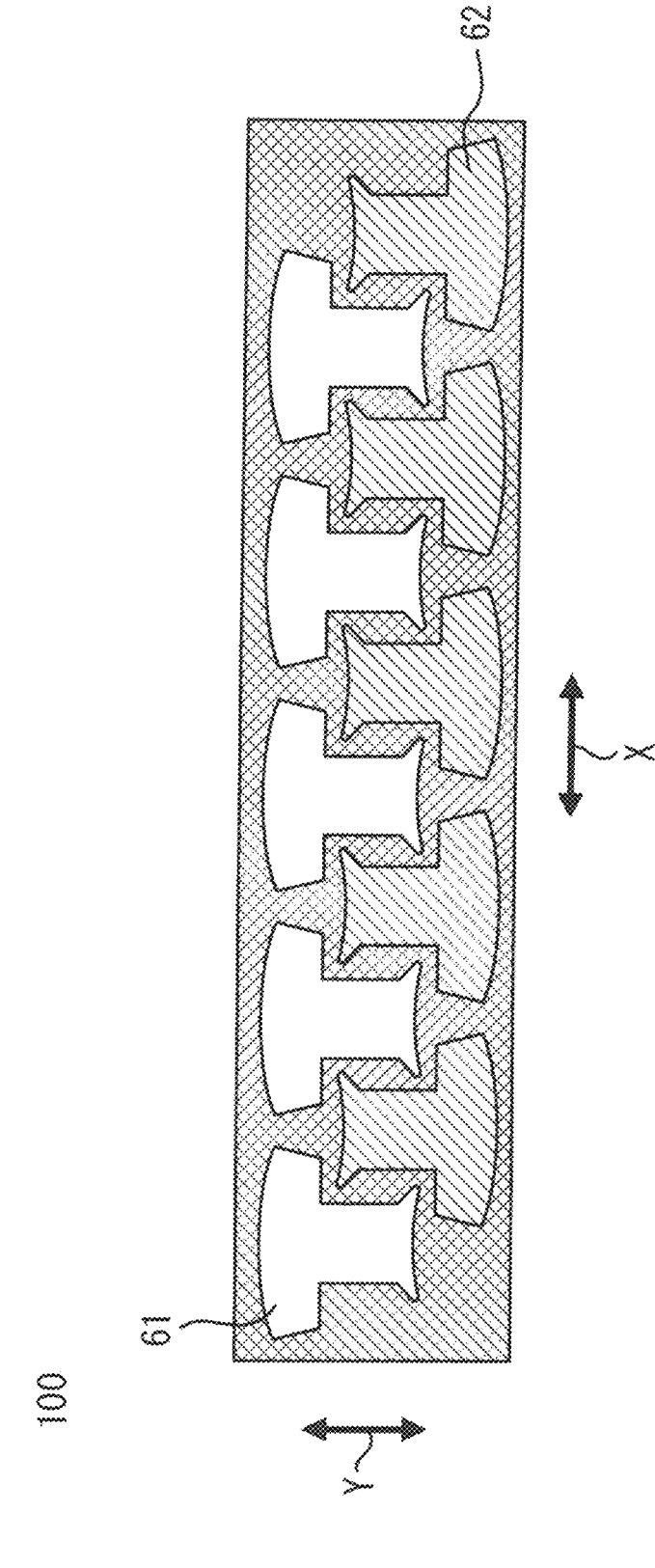
FIG. 12 shows a stacked core production method according to embodiment 3.

Accordingly, in the present embodiment 3, as shown in FIG. 12, the first core sheets 11 and the second core sheets 21 are stamped at the first positions 61 and the second positions 62 such that their respective directions are reversed from each other in the electromagnetic steel sheet 100, thereby reducing a part where core sheets are not stamped. Thus, material yield of the electromagnetic steel sheet 100 can be improved. In addition, since the sheet thickness deviation of the electromagnetic steel sheet 100 is often uniform in the sheet width direction Y, it is possible to easily produce two kinds of core sheets, i.e., the first core sheets 11 and the second core sheets 21, of which the tendencies of the sheet thicknesses Z are different, by reversing the stamping directions of the core sheets 11, 21 from each other.

Figures 13A, 13B, 13C:
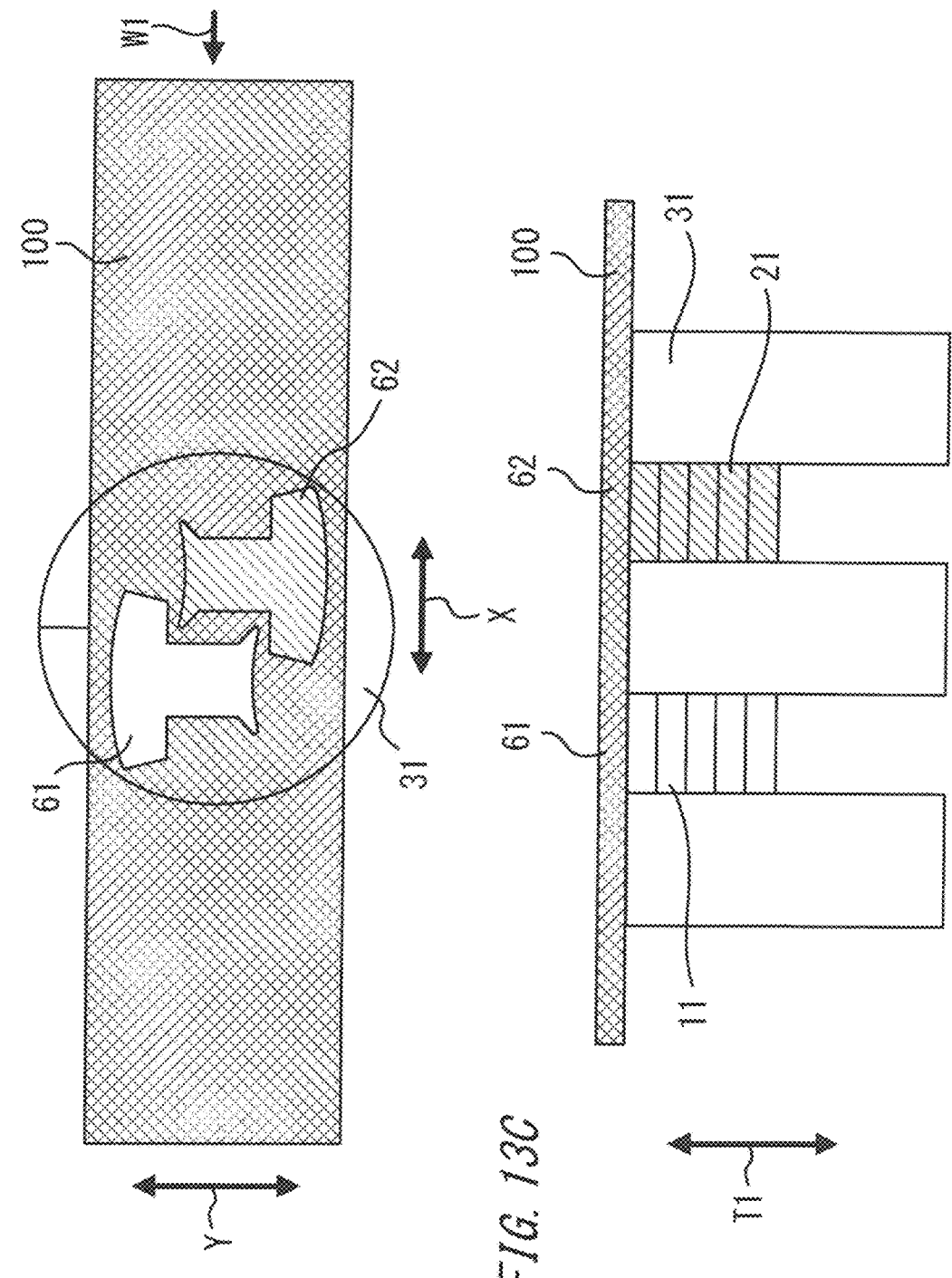
FIGS. 13A-13C show the stacked core production method according to embodiment 3, where
Figures 14A, 14B, 14C:
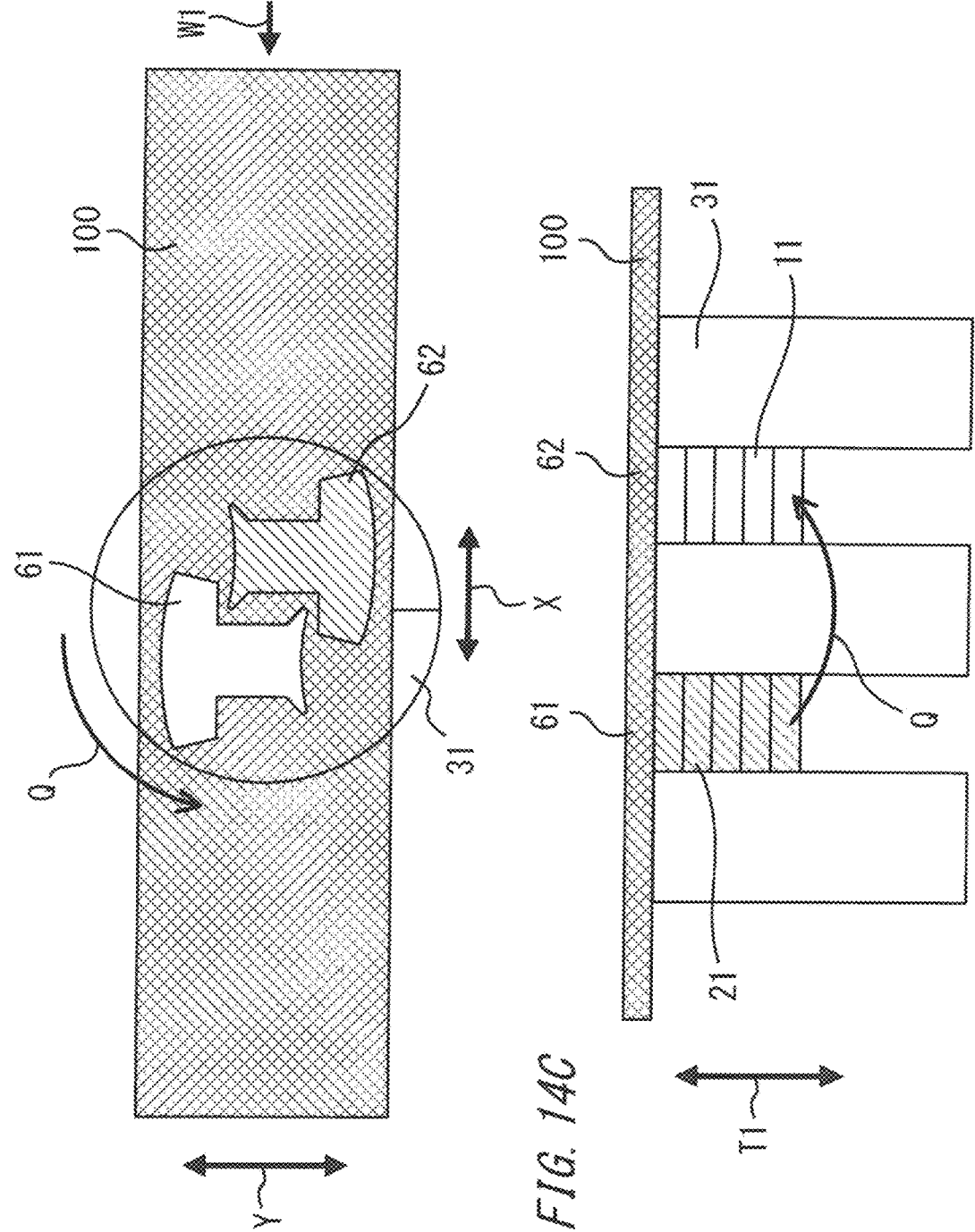
FIGS. 14A-14C show the stacked core production method according to embodiment 3, where
Figures 15A, 15B, 15C:
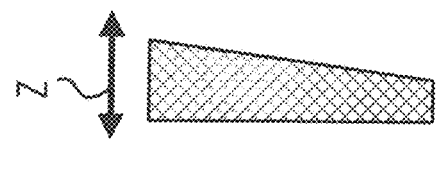
FIGS. 15A-15C show the stacked core production method according to embodiment 3, where

Next, a method for aligning the stamped first core sheets 11 and second core sheets 21 will be described with reference to FIG. 13 to FIG. 16. FIG. 13 to FIG. 15 show a stacked core production method according to embodiment 3. FIG. 13A is a plan view of an electromagnetic steel sheet, FIG. 13B shows the sheet thickness of the electromagnetic steel sheet as seen from the direction of arrow W1 in FIG. 13A, and FIG. 13C is a side view of core sheets that are stamped and stacked. FIG. 14A is a plan view of the electromagnetic steel sheet, FIG. 14B shows the sheet thickness of the electromagnetic steel sheet as seen from the direction of arrow W1 in FIG. 14A, and FIG. 14C is a side view of core sheets that are stamped and stacked. FIG. 15A is a plan view of the electromagnetic steel sheet, FIG. 15B shows the sheet thickness of the electromagnetic steel sheet as seen from the direction of arrow W1 in FIG. 15A, and FIG. 15C is a side view of the core sheets that are stamped and stacked. In the drawings, the same parts as those in the above embodiments are denoted by the same reference characters and the description thereof is omitted. In FIG. 13 to FIG. 16, for convenience sake, the sheet thicknesses are shown in a constant size.

As shown in FIG. 14, a die 31 which is rotatable in a horizontal direction Q with respect to the sheet width direction Y and the rolling direction X, is used. As also described above, in general, the sheet thickness Z of the electromagnetic steel sheet 100 is not greater than 0.5 mm and thus is very thin, and therefore it is difficult to take out the first core sheet 11 and the second core sheet 21 stamped at different positions in the sheet width direction Y, from the press machine, and then align the core sheets while stacking them alternately.

Accordingly, as shown in FIG. 13 to FIG. 15, the die 31 is rotated by 180 degrees in the horizontal direction Q with respect to the rolling direction X and the sheet width direction Y, at certain intervals, in synchronization with stamping by the press machine, whereby the first core sheet 11 and the second core sheet 21 stamped at different positions in the sheet width direction Y are aligned while being alternately stacked in the die 31.

Specifically, first, as shown in FIG. 13A, the electromagnetic steel sheet 100 is stamped in a state in which the die 31 is placed at a predetermined position. Here, the first core sheet 11 at the first position 61 and the second core sheet 21 at the second position 62 are stamped at the same time by one press operation. Then, through five press operations, five first core sheets 11 and five second core sheets 21 are aligned and stacked in the stacking direction T1 in the die 31 as shown in FIG. 13C.

Next, in a case where predetermined numbers of sheets to be stacked are five for the first core sheets 11 and the second core sheets 21, the die 31 is rotated by 180 degrees in the horizontal direction Q as shown in FIG. 14A. As a result, as shown in FIG. 14C, the five second core sheets 21 aligned and stacked are placed under the first position 61, and the five first core sheet 11 aligned and stacked are placed under the second position 62.

In this state, the electromagnetic steel sheet 100 is stamped again as shown in FIG. 15A, so that the first core sheet 11 stamped at the first position 61 is aligned and stacked above the five second core sheets 21 aligned and stacked, as shown in FIG. 15C. In addition, the second core sheet 21 stamped at the second position 62 is aligned and stacked above the five first core sheets 11 aligned and stacked.

Figure 16:
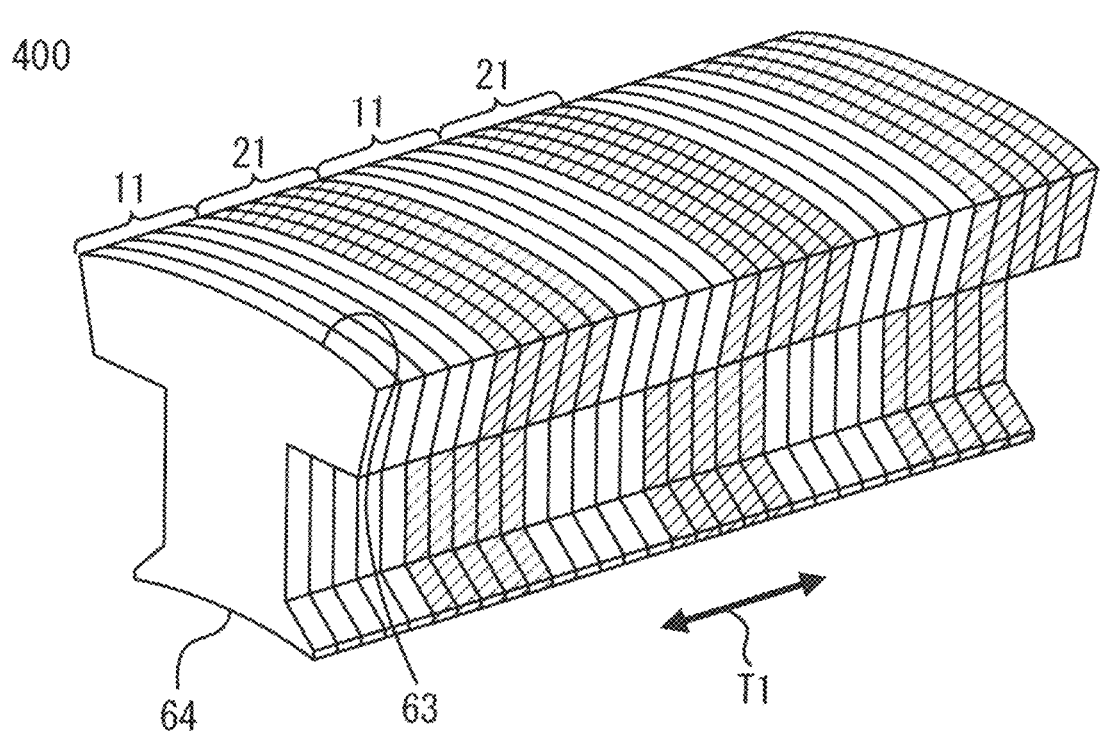
FIG. 16 is a perspective view showing the structure of a core sheet set according to embodiment 3.

The above operation is repeatedly performed for every predetermined number of times of stamping, here, for every predetermined numbers (i.e., five) of the first core sheets 11 and the second core sheets 21 that are stacked, whereby a core sheet set 400 composed of the first core sheets 11 and the second core sheets 21 is formed as shown in FIG. 16. The core sheet set 400 formed as described above can be taken out from the die 31 while kept aligned, and thus it becomes possible to reduce the time and cost required for the alignment step.

The core sheet set 400 may be taken out as the core sheet set 40 from the die 31 at the time when a necessary number of sheets for the stacked core 4 are stacked. However, without limitation thereto, as shown in FIG. 16, the core sheet set 400 in which more sheets than a necessary number of sheets for the stacked core 4 are stacked may be taken out from the die 31, and after taken out, the core sheet set 400 may be divided into the core sheet set 40 composed of a necessary number of sheets for the stacked core 4. In this case, the required time and cost can be further reduced.

In the stacked core production method according to embodiment 3 configured as described above, in the alignment step, in synchronization with the stamping step, at least either the first core sheet or the second core sheet is stacked for a predetermined number of sheets, and when the predetermined number of sheets are stacked, rotation is performed by 180 degrees in a horizontal direction and the second core sheet or the first core sheet different from the stacked first core sheet or second core sheet is stacked so as to be aligned, to form the core sheet set.

Thus, the first core sheets and the second core sheets can be continuously and easily aligned and stacked without being taken out from the stamping step, whereby productivity is improved.

In addition, the number of steps can be decreased, so that the time taken for production is shortened, whereby productivity is improved.

Embodiment 4

In the above embodiments, an alignment device for the first core sheets 11, 12 and the second core sheets 21, 22 after stamping has not been shown specifically. In the present embodiment 4, the alignment device will be described. The other matters are the same as in the above embodiments and therefore the description thereof is omitted as appropriate. In the present embodiment 4, description will be given using the first core sheets 11 and the second core sheets 21 as an example.

Figure 17:
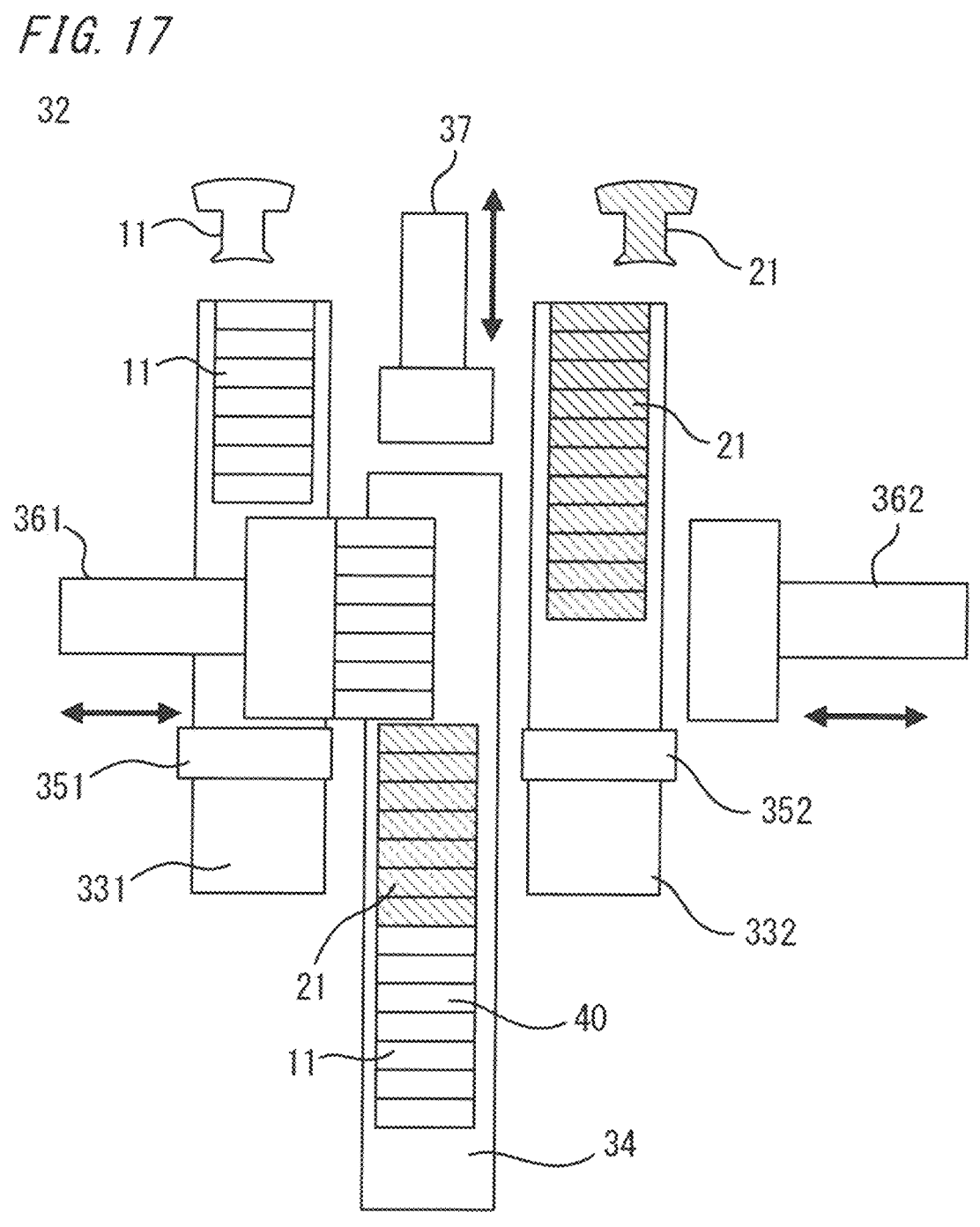
Figure 18:
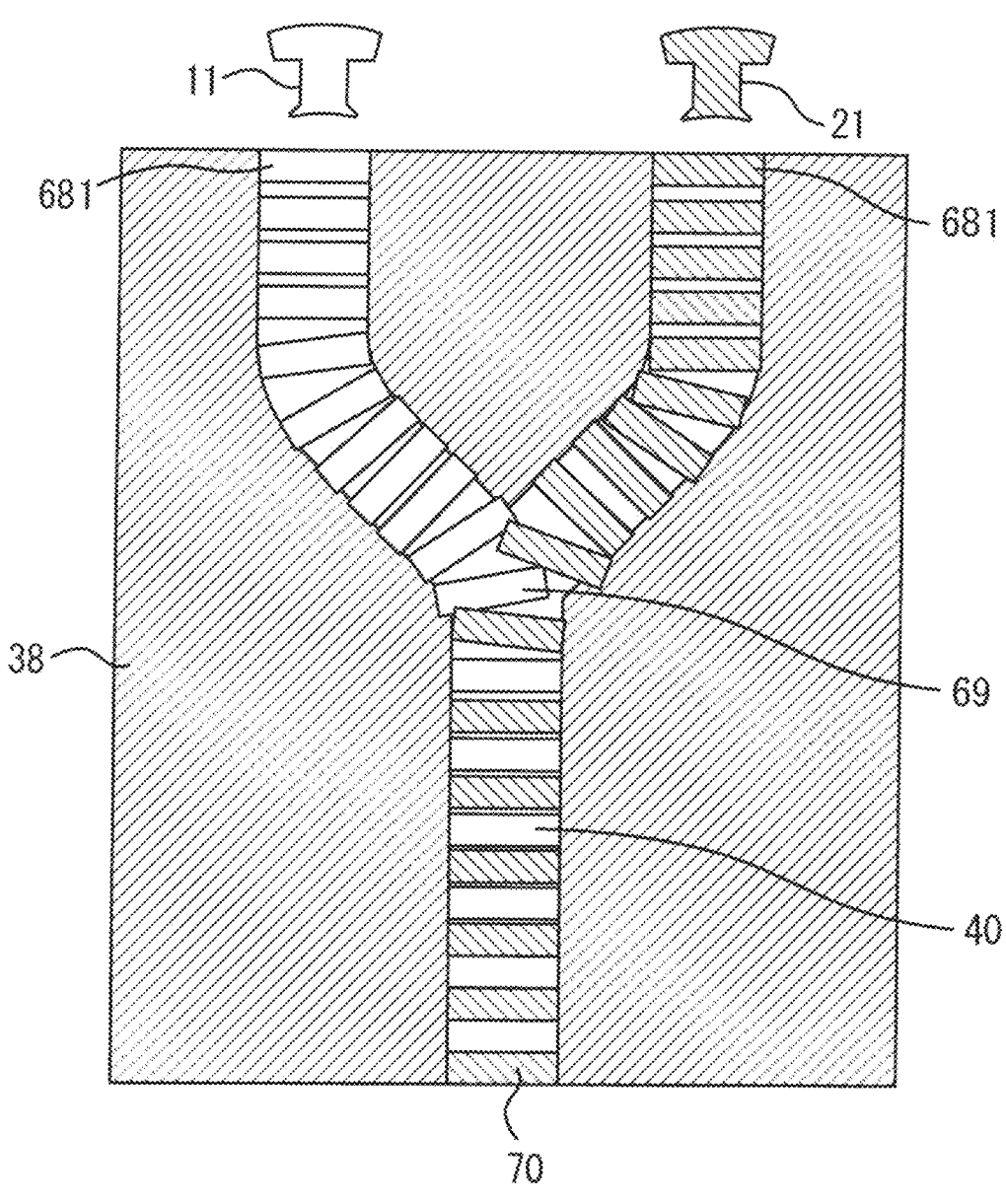
FIG. 18 shows the structure of another alignment device for a stacked core according to embodiment 4.

FIG. 17 shows the structure of the alignment device for a stacked core according to embodiment 4. FIG. 18 shows the structure of another alignment device for a stacked core according to embodiment 4. In the drawings, the same parts as those in the above embodiments are denoted by the same reference characters and the description thereof is omitted. In FIG. 17 and FIG. 18, for convenience sake, the sheet thicknesses are shown in a constant size.

As shown in FIG. 17, an alignment device 32 includes a transportation lane 331 for transporting the first core sheets 11 downward in the drawing, a transportation lane 332 for transporting the second core sheets 21 downward in the drawing, an alignment lane 34 for aligning the core sheets 11, 21 and ejecting them as the core sheet set 40, a stopper 351 for stopping the first core sheets 11 at a certain position on the transportation lane 331, a stopper 352 for stopping the second core sheets 21 at a certain position on the transportation lane 332, a transfer block 361 for transferring the first core sheets 11 from the transportation lane 331 to the alignment lane 34, a transfer block 362 for transferring the second core sheets 21 from the transportation lane 332 to the alignment lane 34, and an ejection block 37 for pushing out the core sheet set 40 formed on the alignment lane 34, in an ejection direction.

Next, a procedure for aligning the core sheets 11, 21 by the alignment device 32 according to embodiment 4 configured as described above will be described. First, a plurality of the stamped first core sheets 11 are put onto the transportation lane 331 from the upper side in the drawing, and are moved so that the leading end of the first core sheets 11 abuts on the stopper 351. Similarly, a plurality of the second core sheets 21 are put onto the transportation lane 332 and are moved so that the leading end of the second core sheets 21 abuts on the stopper 352.

Next, in a state in which the plurality of first core sheets 11 on the transportation lane 331 are pushed against the stopper 351, the transfer block 361 is moved toward the alignment lane 34 side, to transfer the first core sheets 11 onto the alignment lane 34. Next, the ejection block 37 is moved downward in the drawing, to move the plurality of first core sheets 11 downward in the drawing. Thereafter, in a state in which the second core sheets 21 on the transportation lane 332 are pushed against the stopper 352, the transfer block 362 is moved toward the alignment lane 34 side, to transfer the second core sheets 21 onto the alignment lane 34. Next, the ejection block 37 is moved downward in the drawing, to move the plurality of second core sheets 21 downward in the drawing. By repeating the above operation, the core sheet set 40 in which the first core sheets 11 and the second core sheets 21 are alternately stacked per certain number of sheets can be produced.

As another example, the core sheet set 40 may be produced using an alignment block 38 as shown in FIG. 18. The first core sheets 11 are put into an entrance 681 of the alignment block 38, and the second core sheets 21 are put into an entrance 682 of the alignment block 38. The core sheets 11, 21 put through the entrances 681, 682 are alternately stacked at a combining portion 69, and the core sheet set 40 in which the first core sheets 11 and the second core sheets 21 are alternately stacked is obtained at an exit 70. By using the alignment block 38 as described above, the core sheet set 40 can be produced with a simple structure as compared to the alignment device 32 described above, thus providing an effect of reducing the device cost and improving productivity.

In the stacked core production method according to embodiment 4 configured as described above, the same effects as in the above embodiment 3 are provided, and in addition, in the alignment step, the first core sheets and the second core sheets are put into different entrances, and until reaching an exit where the first core sheets and the second core sheets are merged, directions of the tooth end sides of the first core sheets and the second core sheets are aligned with each other to form the core sheet set.

Thus, the directions of the first core sheets and the second core sheets can be easily aligned.

In FIG. 18 in the above embodiment 4, the method for aligning the first core sheets 11 and the second core sheets 21 in one row has been described merely as a conceptual example. In this regard, more specific examples will be described in embodiments 5 and 6 below. The other matters are the same as in the above embodiments and therefore the description thereof is omitted as appropriate.

Embodiment 5

Figure 21:
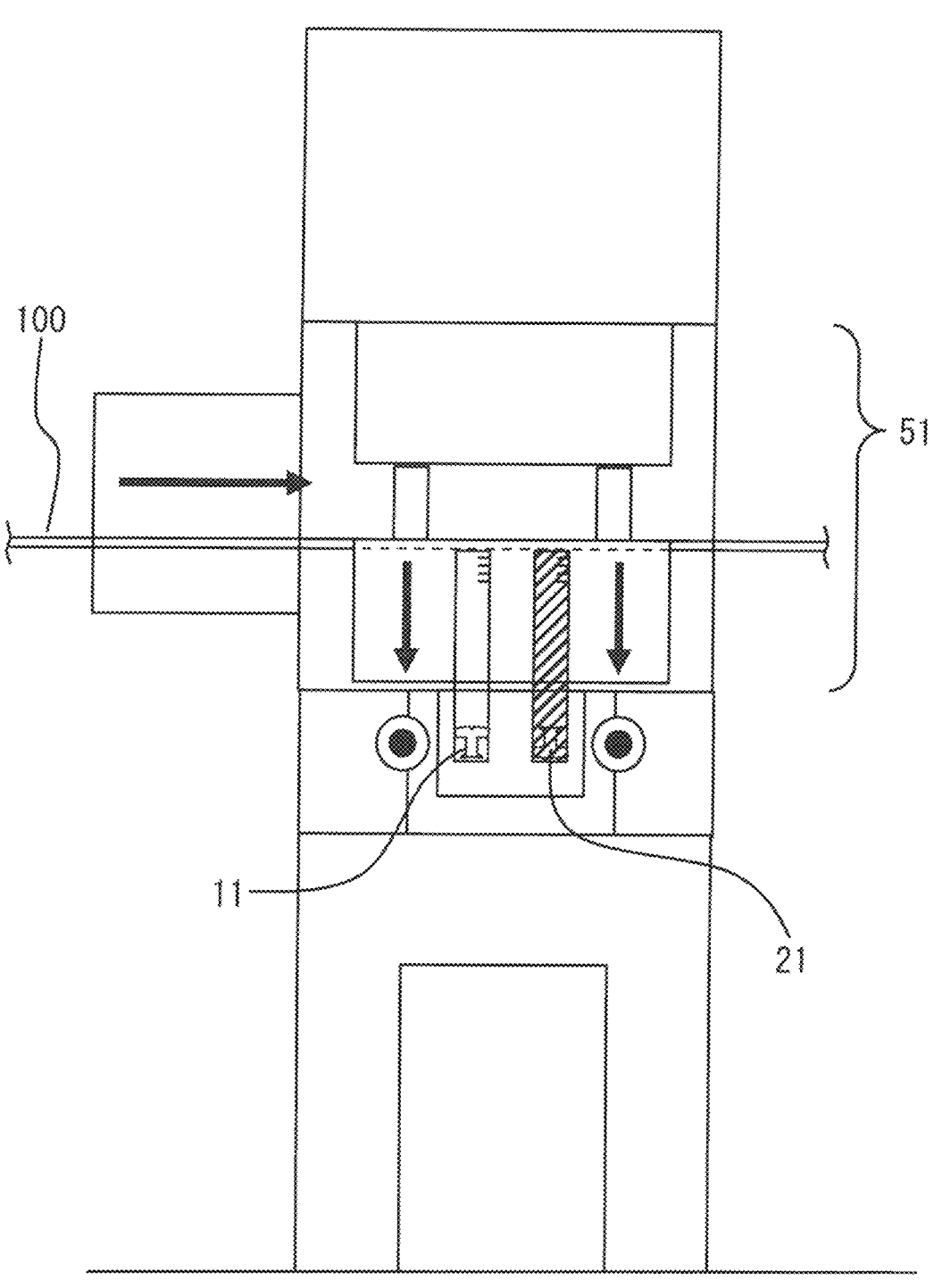
FIG. 21 shows the structure of a press machine according to embodiment 5.
Figure 22:
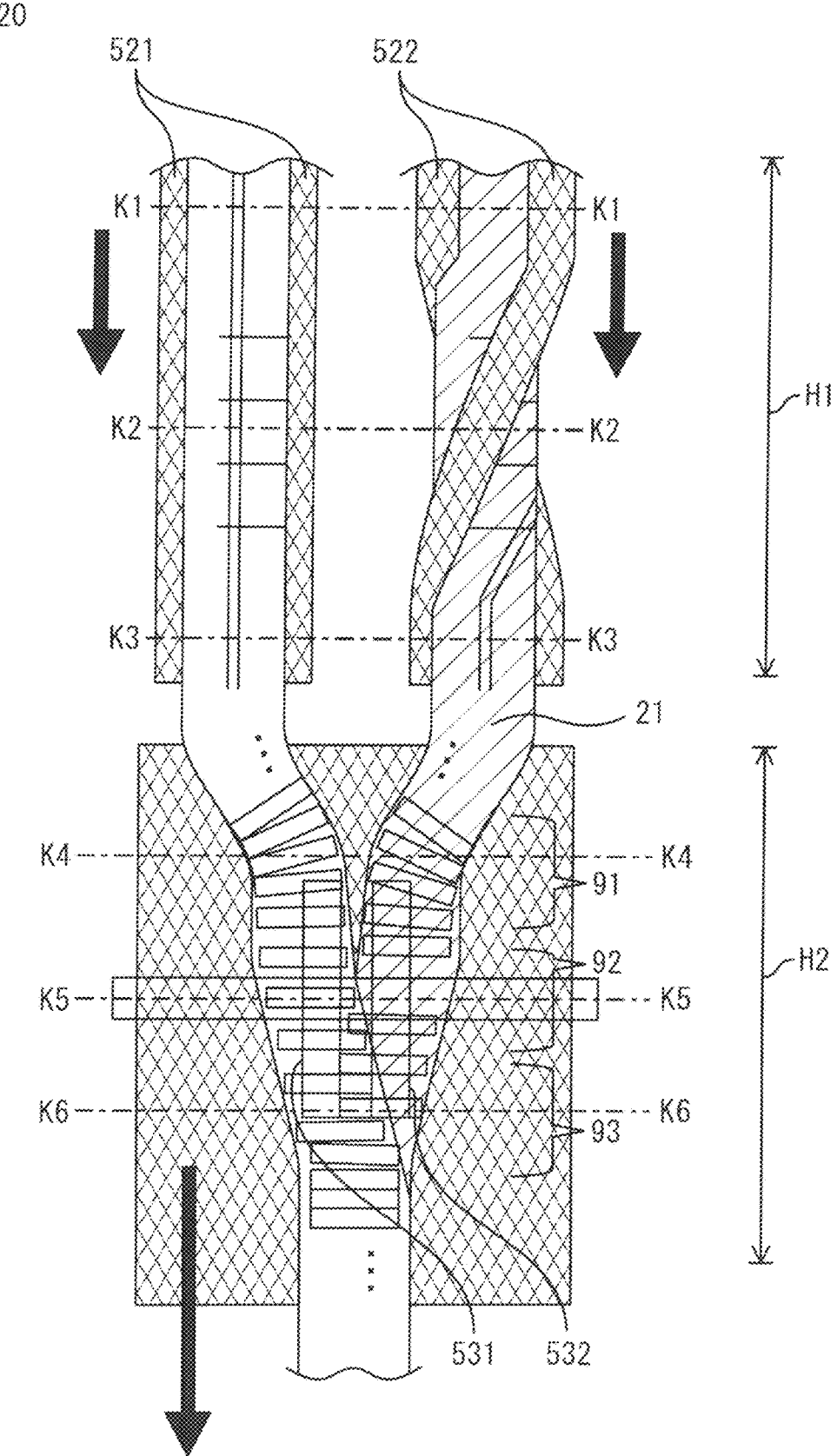
FIG. 22 shows the structure of an alignment device for a stacked core according to embodiment 5.
Figure 23:
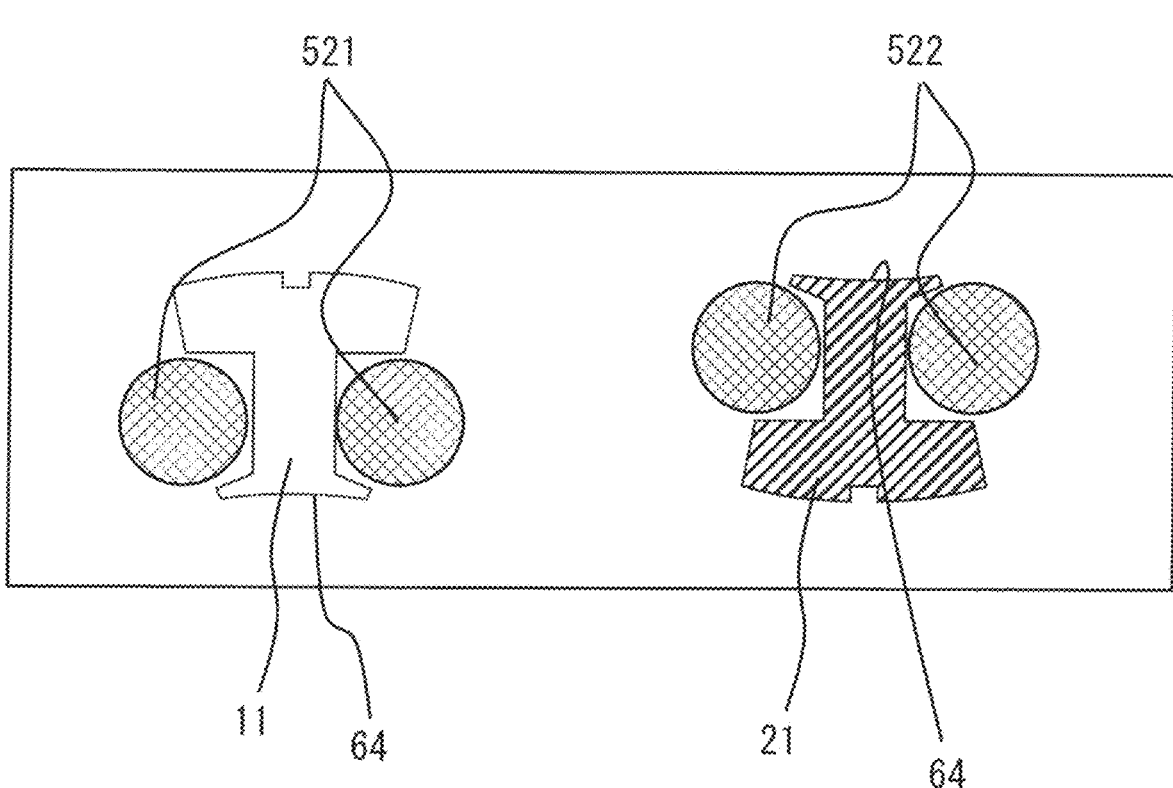
FIG. 23 is a plan view showing the states of a first core sheet and a second core sheet at position K1-K1 in the alignment device shown in FIG. 22.
Figure 24:
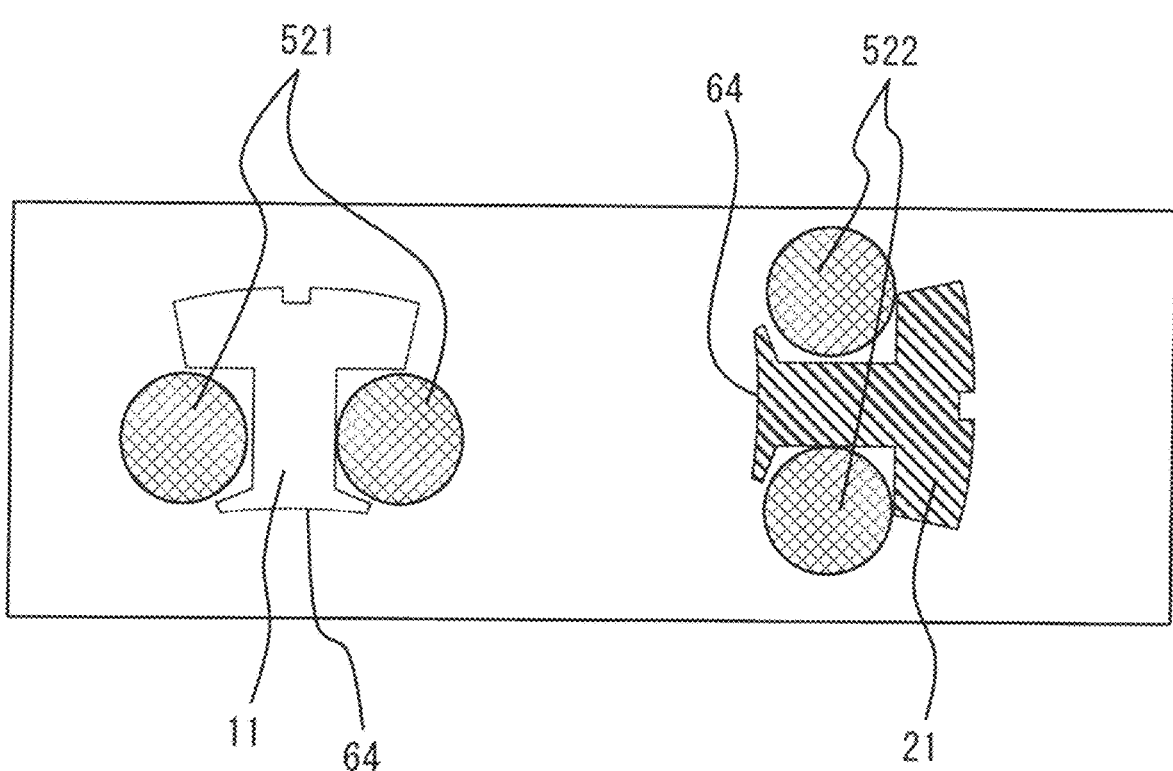
FIG. 24 is a plan view showing the states of the first core sheet and the second core sheet at position K2-K2 in the alignment device shown in FIG. 22.
Figure 25:
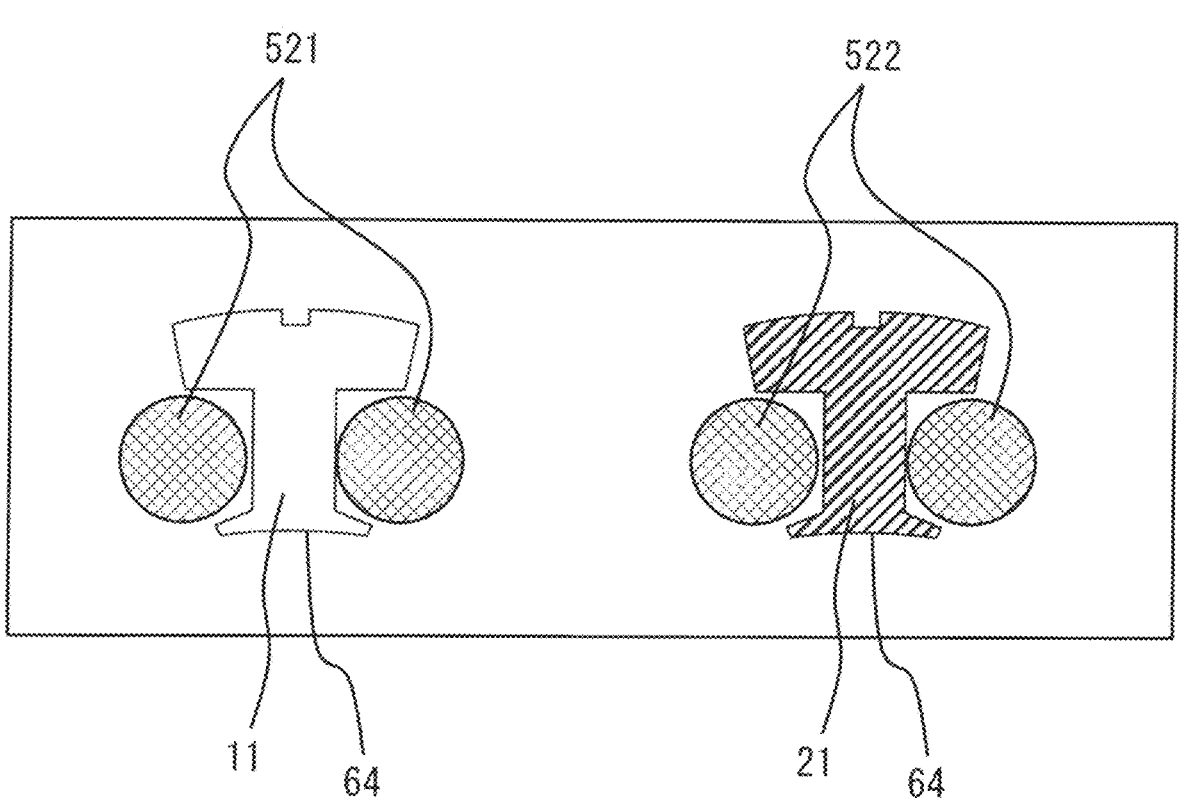
FIG. 25 is a plan view showing the states of the first core sheet and the second core sheet at position K3-K3 in the alignment device shown in FIG. 22.
Figure 26:
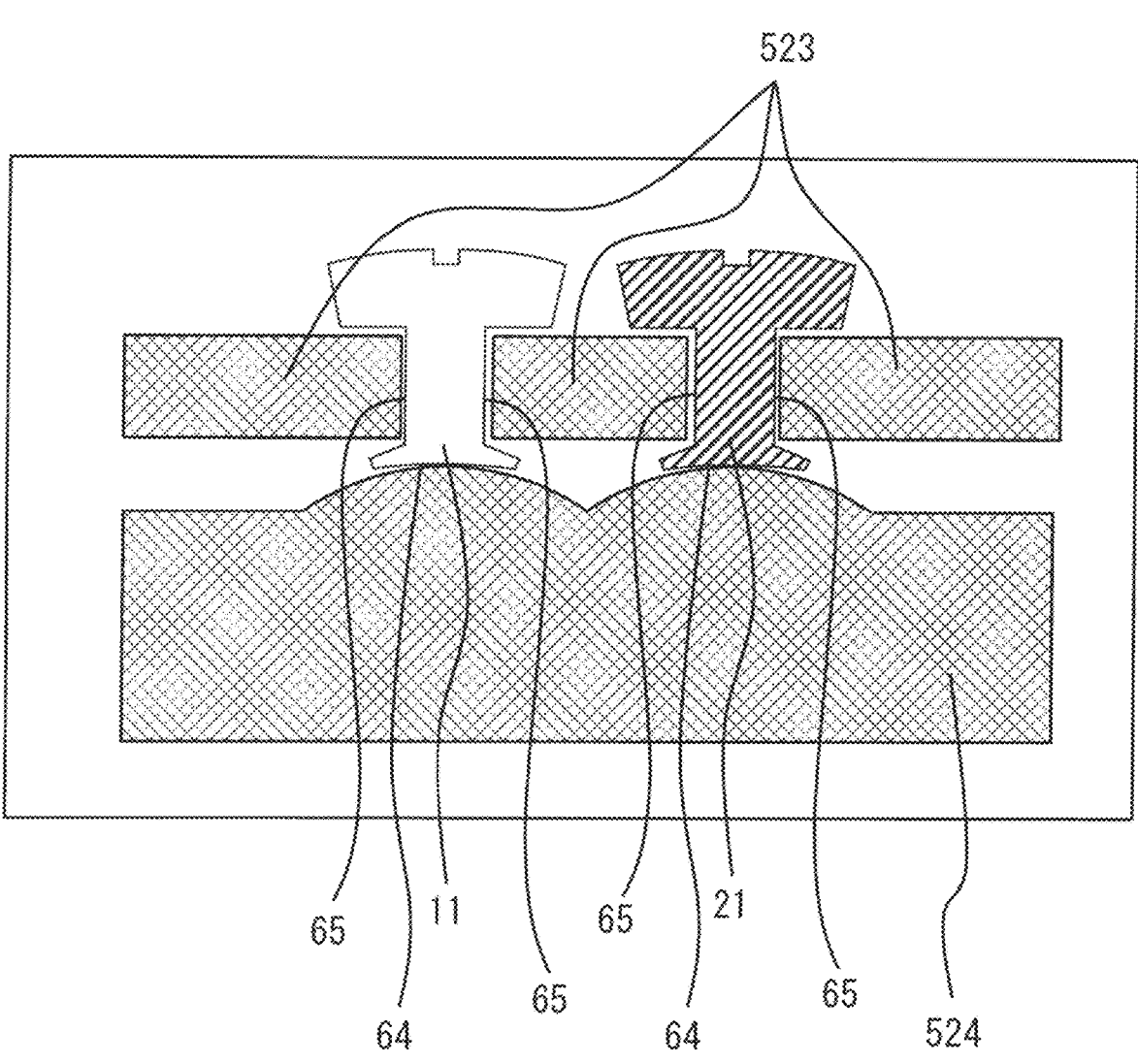
FIG. 26 is a plan view showing the states of the first core sheet and the second core sheet at position K4-K4 in the alignment device shown in FIG. 22.
Figure 27:
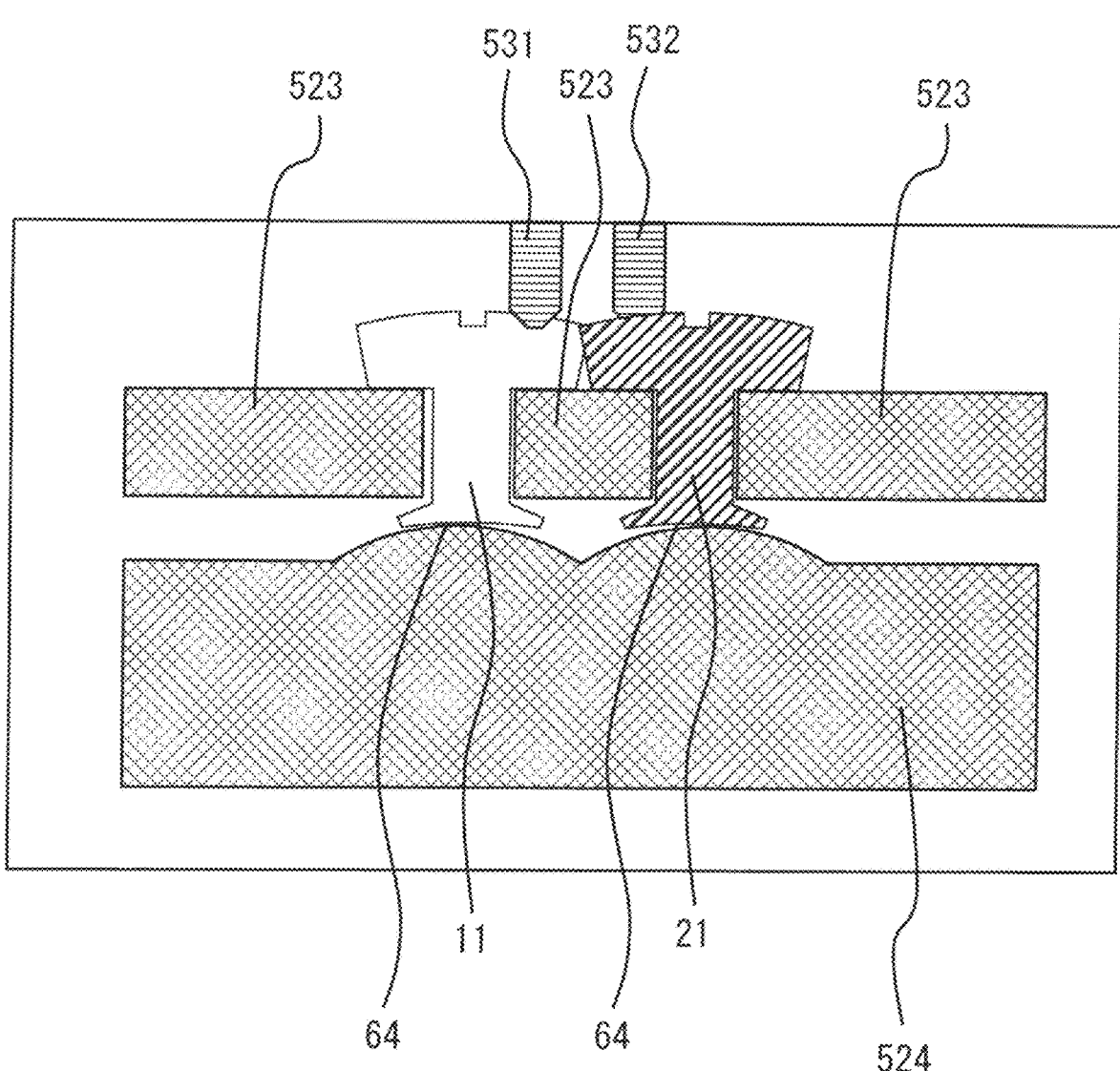
FIG. 27 is a plan view showing the states of the first core sheet and the second core sheet at position K5-K5 in the alignment device shown in FIG. 22.
Figure 28:
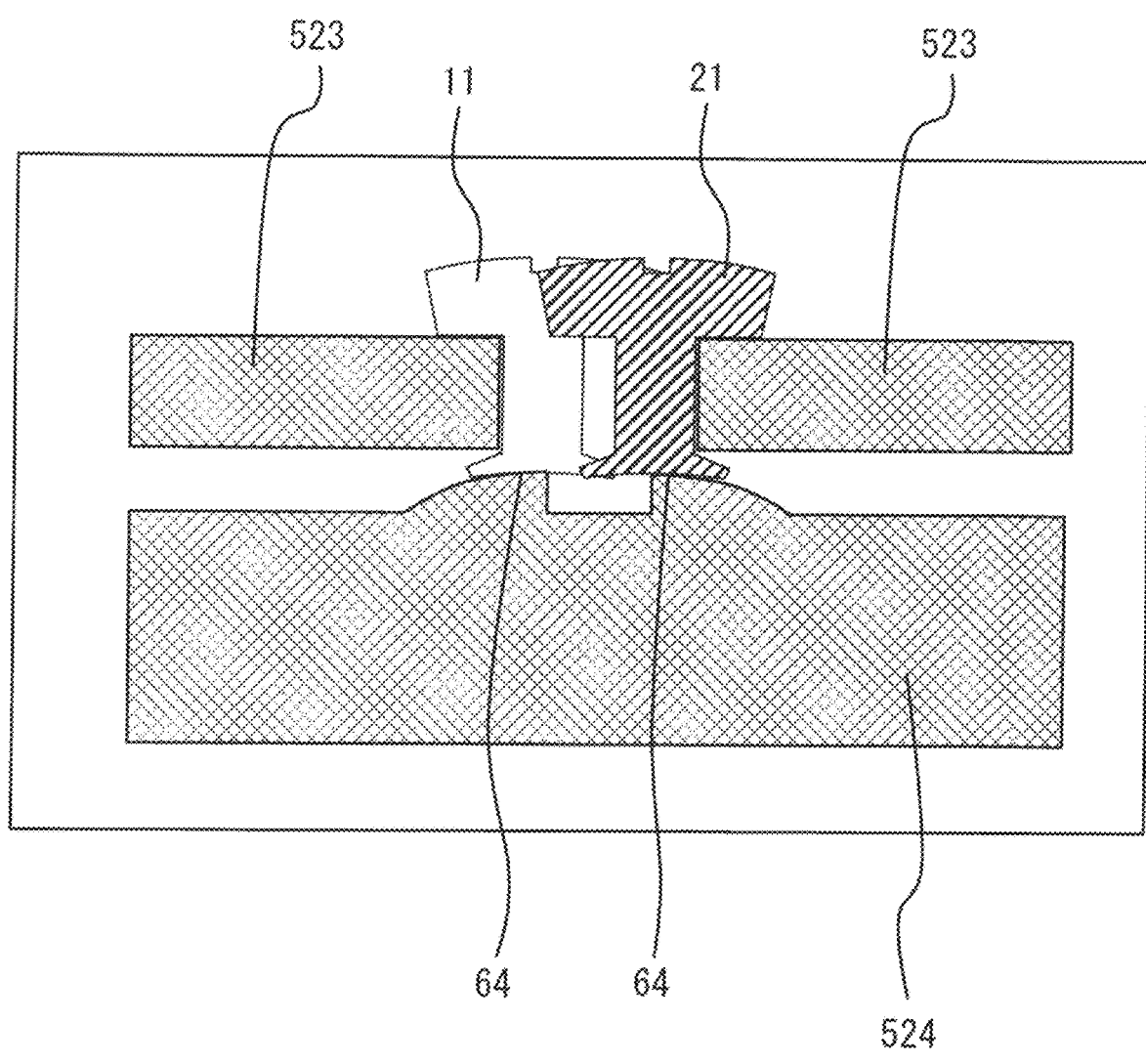
FIG. 28 is a plan view showing the states of the first core sheet and the second core sheet at position K6-K6 in the alignment device shown in FIG. 22.

FIG. 21 shows the structure of a press machine according to embodiment 5. FIG. 22 shows the structure of an alignment device for a stacked core according to embodiment 5. FIG. 23 is a plan view showing the states of the first core sheet and the second core sheet at position K1-K1 in the alignment device shown in FIG. 22. FIG. 24 is a plan view showing the states of the first core sheet and the second core sheet at position K2-K2 in the alignment device shown in FIG. 22. FIG. 25 is a plan view showing the states of the first core sheet and the second core sheet at position K3-K3 in the alignment device shown in FIG. 22. FIG. 26 is a plan view showing the states of the first core sheet and the second core sheet at position K4-K4 in the alignment device shown in FIG. 22. FIG. 27 is a plan view showing the states of the first core sheet and the second core sheet at position K5-K5 in the alignment device shown in FIG. 22. FIG. 28 is a plan view showing the states of the first core sheet and the second core sheet at position K6-K6 in the alignment device shown in FIG. 22. In the drawings, the same parts as those in the above embodiments are denoted by the same reference characters and the description thereof is omitted.

As shown in FIG. 21, a press machine 50 feeds a ribbon-shaped electromagnetic steel sheet 100 to a mounted die set 51, and stamps the first core sheet 11 and the second core sheet 21. As the first core sheets 11 and the second core sheets 21 are repeatedly stamped, the stamped first core sheets 11 and second core sheets 21 are pressed and sent downward in the die set 51. Then, the advancement direction in which the core sheets 11, 21 are pressed and sent is bent so that they are pressed and sent toward the near side of the drawing. Alternatively, without bending the advancement direction of the core sheets 11, 21, an alignment device for aligning the first core sheets 11 and the second core sheets 21 in one row as described below may be placed directly under the die set 51.

In an alignment device 320 shown in FIG. 22, the first core sheets 11 and the second core sheets 21 are put into different entrances, and until reaching an exit where the first core sheets 11 and the second core sheets 21 are merged, the directions of the tooth end sides 64 of the first core sheets 11 and the second core sheets 21 are aligned with each other to form the core sheet set 40. Then, with respect to the first core sheets 11 and the second core sheets 21 ejected from the press machine 50, the alignment device 320 has a "direction-alignment section H1" where the directions of the tooth end sides 64 of the first core sheets 11 and the second core sheets 21 are aligned, and a "merging section H2" where the first core sheets 11 and the second core sheets 21 are aligned in one row.

In the direction-alignment section H1, linear guides 521 and helical guides 522 are provided, and in the merging section H2, a side-surface guide 523, an end guide 524, a first gear 531, and a second gear 532 are provided (see FIG. 26 to FIG. 28). The merging section H2 includes a bending portion 91, an overlapping portion 92, and an alignment portion 93. The details of each portion will be described later.

The linear guides 521 guide the first core sheets 11 being pressed and sent, in a constant direction, while supporting them. The helical guides 522 guide the second core sheets 21 being pressed and sent, while turning the directions of them. The side-surface guide 523 guides tooth side surfaces 65 of the core sheets 11, 21. The end guide 524 guides the tooth end sides 64 of the core sheets 11, 21. The first gear 531 and the second gear 532 stack the core sheets 11, 21 per predetermined number of sheets.

Next, a method for aligning, in one row, the first core sheets 11 and the second core sheets 21 ejected from the press machine 50, using the alignment device 320 configured as described above, will be described. First, in the direction-alignment section H1, as shown in FIG. 22 and FIG. 23, the tooth end sides 64 of the first core sheet 11 and the second core sheet 21 introduced into the alignment device 320 are originally directed toward sides opposite to each other. Then, the first core sheet 11 is moved while the direction thereof is kept constant by the linear guides 521, and the second core sheet 21 is moved while the direction thereof is turned by the helical guides 522. Then, as shown in FIG. 22 and FIG. 24, the direction of the second core sheet 21 is turned, so that finally, the directions of the first core sheet 11 and the second core sheet 21 are aligned with each other and the directions of the tooth end sides 64 of the first core sheet 11 and the second core sheet 21 are aligned with each other, as shown in FIG. 22 and FIG. 25.

Here, the example in which the direction of the second core sheet 21 is turned so as to align the directions of the tooth end sides 64 of the first core sheet 11 and the second core sheet 21 with each other, has been shown. However, without limitation thereto, the direction of the first core sheet 11 may be turned or the directions of both of the first core sheet 11 and the second core sheet 21 may be turned, so as to align the directions of the tooth end sides 64 of the first core sheet 11 and the second core sheet 21 with each other.

Here, the example in which a pressure-sending guide formed by two helical guides 522 is used has been shown. However, without limitation thereto, a configuration in which one linear guide is provided and a helical guide is provided therearound may be adopted, whereby it is possible to turn the direction of the core sheet as in the case of using two helical guides 522. Alternatively, a column having a helical groove on the side surface thereof or a cylinder having a helical cutout groove may be used to form a path for turning the direction of the core sheet. Still alternatively, using a 3D printer or the like, a hole having substantially the same sectional shape as the core sheet shape may be formed in a helical shape, to form the path.

Next, after moving through the direction-alignment section H1, the first core sheet 11 and the second core sheet 21 of which the directions of the tooth end sides 64 are aligned with each other, enter the merging section H2. As shown in FIG. 22 and FIG. 26, the first core sheet 11 and the second core sheet 21 are guided by the side-surface guide 523 formed of three plates and for guiding the tooth side surfaces 65, and the end guide 524 for guiding the tooth end sides 64, while the core sheets 11, 12 are pressed and sent. The merging section H2 has a path formed by the bending portion 91, the overlapping portion 92, and the alignment portion 93, and the roles of these portions will be described. In the bending portion 91, the first core sheets 11 and the second core sheets 21 are moved closer to each other while gaps are formed between the stacked core sheets 11 and between the stacked core sheets 21. That is, since a trajectory of the path in the bending portion 91 is longer on the outer peripheral side than on the inner peripheral side, gaps are formed between the stacked core sheets 11 and between the stacked core sheets 21, on the outer sides in the bending portion 91.

Next, as shown in FIG. 22 and FIG. 27, in the overlapping portion 92, a path for further moving the first core sheets 11 and the second core sheets 21 closer to each other is formed, and the first gear 531 and the second gear 532 are provided. The first gear 531 is located close to the first core sheets 11, the second gear 532 is located close to the second core sheets 21, and the first gear 531 and the second gear 532 are fixed to the same rotatable shaft with their phases shifted from each other by half the pitch. Into the stacking-direction gap formed between the first core sheets 11 that have moved through the bending portion 91, a tooth top of the first gear 531 enters per one sheet or per several sheets among the first core sheets 11, while the first gear 531 rotates along with the pressed-sending of the first core sheets 11. Similarly, into the stacking-direction gap formed between the second core sheets 21 that have moved through the bending portion 91, the tooth top of the second gear 532 enters per one sheet or per several sheets among the second core sheets 21, while the second gear 532 rotates along with pressed-sending of the second core sheets 21.

Since the first gear 531 and the second gear 532 rotate in a state of being fixed to the same shaft with their phases shifted from each other by half the pitch, the core sheets 11, 21 are alternately sent per one sheet or per several sheets to the next alignment portion 93. That is, by the first gear 531 and the second gear 532, the core sheets 11, 21 can be alternately overlapped with each other per one sheet or per several sheets without collision between the first core sheet 11 and the second core sheet 21. The gears 531, 532 may be rotated by motive power from an external motor or the like, or may be rotated through pressed-sending of the core sheets 11, 21.

Next, as shown in FIG. 22 and FIG. 28, in the alignment portion 93, the first core sheets 11 and the second core sheets 21 stacked per one core sheet or per several core sheets are moved while the width of their paths is gradually narrowed, so that the first core sheets 11 and the second core sheets 21 are aligned to produce the core sheet set 40, which is then sent to the next fixation step. If a plurality of such devices are combined, it also becomes possible to first align four-row core sheets into two rows and then align them from two rows into one row.

In the stacked core production method according to embodiment 5 configured as described above, the same effects as in the above embodiments are provided, and in addition, in the alignment step, the first core sheets and the second core sheets of which the directions of the tooth end sides are aligned with each other are alternately stacked by a gear, to form the core sheet set.

Thus, the gear enables the first core sheets and the second core sheets to be alternately stacked without colliding with each other.

Further, in the stacked core production method according to embodiment 5, in the alignment step, the directions of the tooth end sides of the first core sheets and the second core sheets are aligned with the direction of the tooth end sides of either the first core sheets or the second core sheets stamped in the stamping step, to form the core sheet set.

Thus, it is possible to align the directions of the tooth end sides of the first core sheets and the second core sheets without the need of complicated operation.

Further, in the stacked core production method according to embodiment 5, in the alignment step, the directions of the tooth end sides of the first core sheets and the second core sheets are aligned with a direction different from the directions of the tooth end sides of the first core sheets and the second core sheets stamped in the stamping step, to form the core sheet set.

Thus, it is possible to align the directions of the tooth end sides of the first core sheets and the second core sheets without the need of complicated operation.

Embodiment 6

In the present embodiment 6, a method for aligning the first core sheets 11 and the second core sheets 21 in one row by a method different from that in the above embodiment 5 will be described. The other matters are the same as in the above embodiments and therefore the description thereof is omitted as appropriate.

Figure 29:
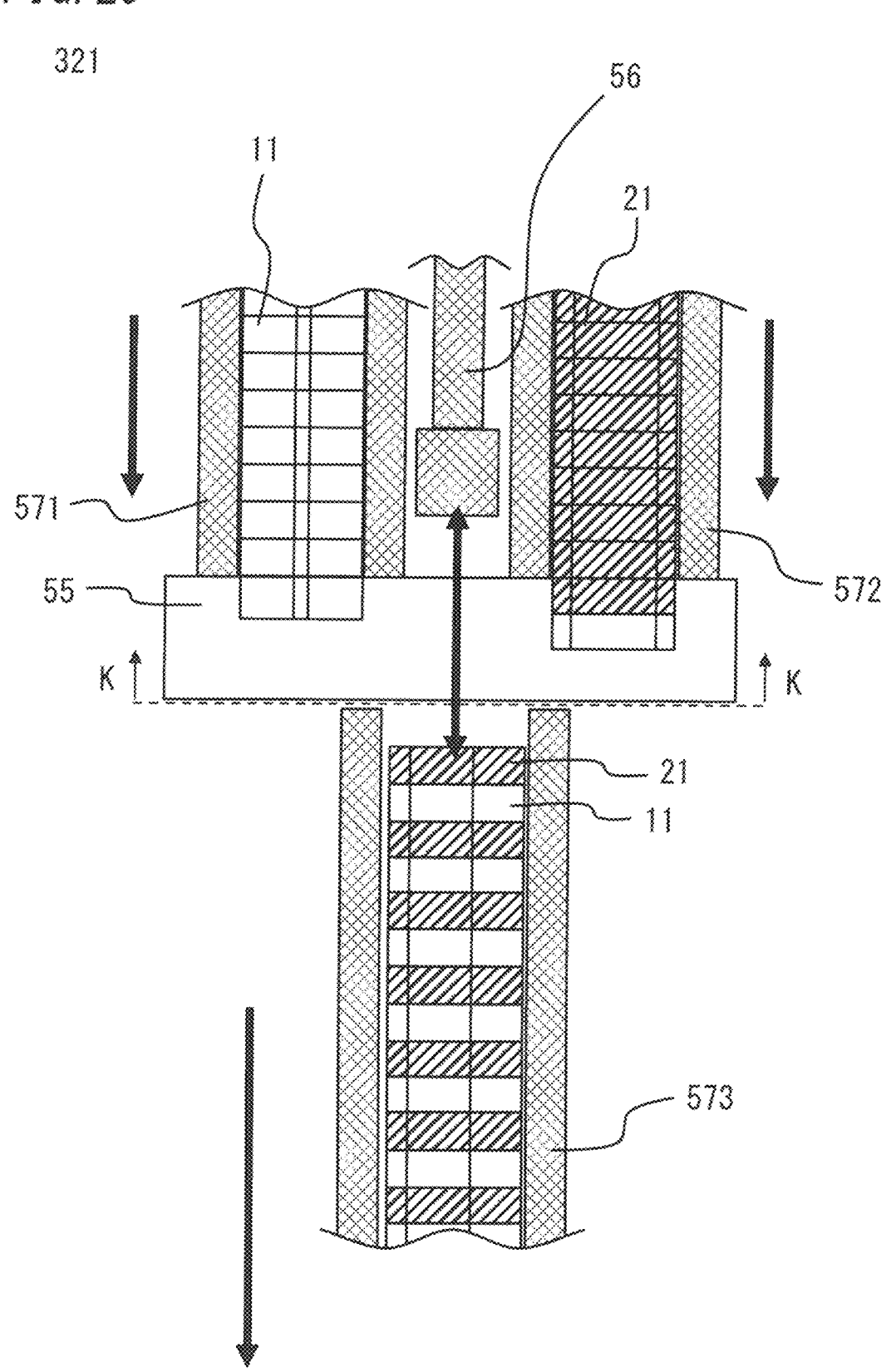
FIG. 29 shows the structure of an alignment device for a stacked core according to embodiment 6.
Figure 30:
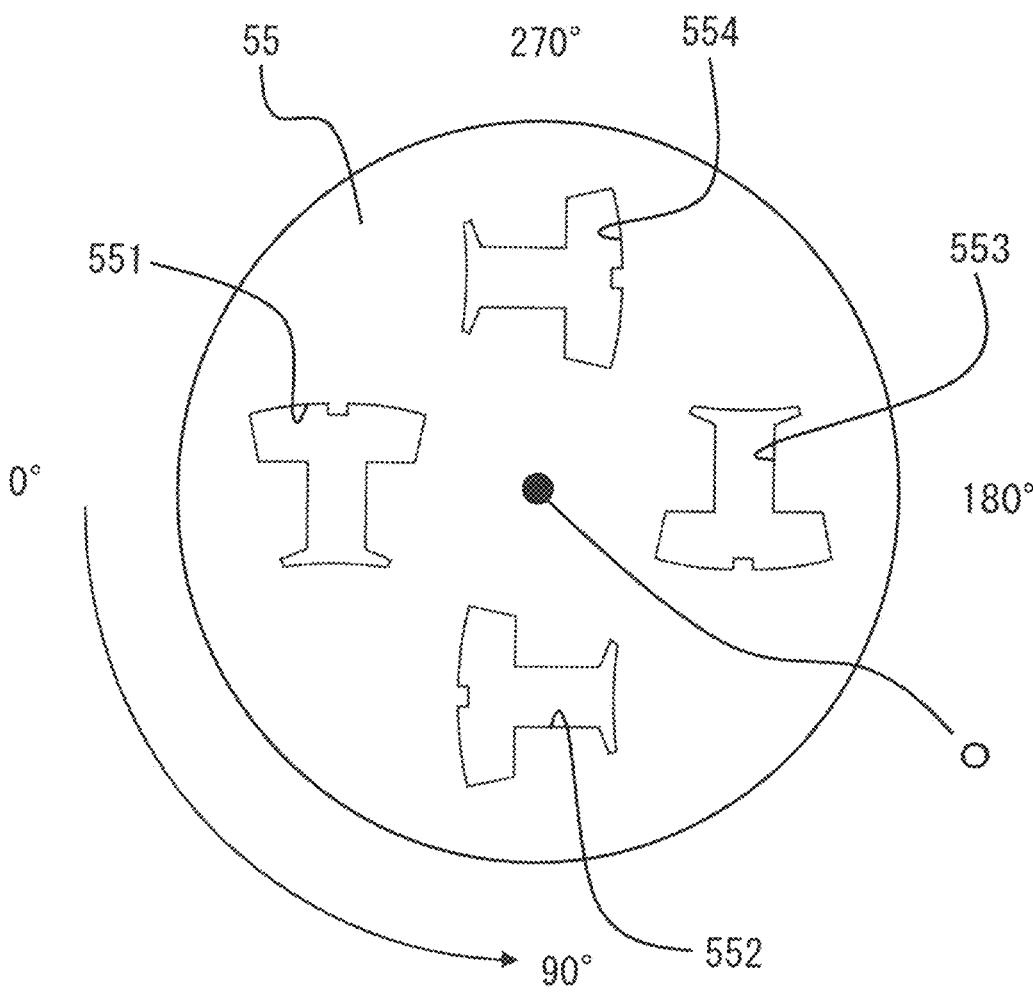
FIG. 30 is a plan view showing the structure of a rotary disk of the alignment device shown in FIG. 29, as seen from the direction of line K-K.

FIG. 29 shows the structure of an alignment device for a stacked core according to embodiment 6. FIG. 30 is a plan view showing the structure of a rotary disk of the alignment device shown in FIG. 29, as seen from the direction of line K-K. In the drawings, the same parts as those in the above embodiments are denoted by the same reference characters and the description thereof is omitted. As shown in FIG. 29, with respect to the first core sheets 11 and the second core sheets 21 ejected from the press machine 50, an alignment device 321 aligns the directions of the tooth end sides 64 of the first core sheets 11 and the second core sheets 21 and aligns them in one row. The alignment device 321 includes a first guide 571, a second guide 572, a rotary disk 55, a pusher 56, and an exit guide 573.

The first guide 571 is formed in communication with a path for the first core sheets 11 pressed and sent by the press machine 50. The second guide 572 is formed in communication with a path for the second core sheets 21. As shown in FIG. 30, the rotary disk 55 has a through hole 551, a through hole 552, a through hole 553, and a through hole 554 at four locations arranged at 90-degree intervals from 0 degrees in the drawing, about a center O as a rotational movement center, and these through holes are formed to penetrate in the same shapes as the core sheets 11, 21. Where the position of the through hole 551 at present is 0 degrees, counterclockwise, the through hole 552 is at a position of 90 degrees, the through hole 553 is at a position of 180 degrees, and the through hole 554 is at a position of 270 degrees. That is, the through holes 551 to 554 are formed at three or more locations, here, four locations, which are arranged at equal intervals about the center O.

The rotary disk 55 is linked with an actuator such as a servomotor directly or via a belt and a gear, and is formed rotatably. In the present embodiment 6, the rotary disk 55 is formed in a circular disk shape, as an example. However, without limitation thereto, a rotary plate having a shape other than a circular disk shape may be used as long as the arrangement relationship of the through holes and movements of the through holes can be realized in the same manner.

The positional relationship between the first core sheets 11 in the first guide 571 and the second core sheets 21 in the second guide 572 is such a positional relationship that the first core sheet 11 overlaps the second core sheet 21 when the first core sheet 11 rotationally moves by 180 degrees about the center O of the rotary disk 55. In other words, this is such a positional relationship that the paths for the first core sheets 11 and the second core sheets 21 coincide with each other when rotationally moving by an angle (here, 180 degrees) obtained by dividing 360 degrees by an integer (here, 2) not less than 2. In the state shown in FIG. 30, the through hole 551 at a position of 0 degrees is connected with the first guide 571, and the through hole 553 at a position of 180 degrees is connected with the second guide 572. Further, the pusher 56 is located at the through hole 554 at a position of 270 degrees, and the through hole 554 is connected with the exit guide 573 on the opposite side. The pusher 56 is linked with an actuator such as a linear servomotor and is formed linearly movable.

Next, coordination operations of the press machine 50, and the rotary disk 55 and the pusher 56 of the alignment device 321 configured as described above, will be described. The rotary disk 55 coordinates with the press machine 50 so as to rotate counterclockwise (in the arrow direction in FIG. 30) by 90 degrees at a timing when the core sheets 11, 21 are not stamped, per one process or a certain plural number of processes of the press machine 50. In other words, the rotary disk 55 rotates by an angle (here, 90 degrees) obtained by further dividing, by an integer (here, 2) not less than 1, the angle (here, 180 degrees) obtained by dividing 360 degrees by the integer (here, 2) not less than 2. The pusher 56 performs one reciprocating linear motion to a certain position at a timing when the rotary disk 55 is not rotating, i.e., a timing almost coinciding with the timing when the press machine 50 stamps the core sheets 11, 21.

Regarding the above coordination operation, in a case of rotating the rotary disk 55 per one process, a procedure of aligning the first core sheets 11 and the second core sheets 21 in one row will be described focusing on the through hole 551. In the state shown in FIG. 30, when the core sheets 11, 21 are stamped by the press machine 50, one first core sheet 11 is inserted into the through hole 551 located at a position of 0 degrees and connected with the first guide 571. Stamping at this time is defined as stamping at an Nth time. By the time when (N+1)th-time stamping is performed, the rotary disk 55 rotates so that the through hole 551 in which one first core sheet 11 is inserted moves to a position of 90 degrees.

At the (N+1)th-time stamping, the through hole 551 is not connected with the first guide 571 and therefore remains in the state in which one first core sheet 11 is inserted. Next, at the next (N+2)th-time stamping, the through hole 551 has rotationally moved to a position of 180 degrees and thus has been connected with the second guide 572, and therefore one second core sheet 21 is inserted. That is, at this time, the through hole 551 is in a state in which one first core sheet 11 and one second core sheet 21 are inserted.

At the next (N+3)th-time stamping, the through hole 551 rotationally moves to a position of 270 degrees, and by the pusher 56, one first core sheet 11 and one second core sheet 21 (two sheets in total) are sent to the exit guide 573, resulting in a state in which there are no core sheets in the through hole 551. At the next (N+4)th-time stamping, the through hole 551 rotationally moves to a position of 0 degrees, thus returning to the state at the Nth time and repeating the above operations.

The above description has been given only for the through hole 551. Also for the other through holes 552 to 554, each through hole operates in the same manner as the through hole 551, so that, per one process of the press machine 50, one first core sheet 11 and one second core sheet 21 (two sheets in total) are sent to the exit guide 573. Thus, the core sheet set 40 in which the first core sheets 11 and the second core sheets 21 are alternately stacked is aligned and sent to the next fixation step. In the above description, the case where the rotary disk 55 rotates per one process has been described. In a case where the rotary disk 55 rotates per certain plural number of processes, the core sheet set 40 in which core sheets are alternately stacked per plural sheets is formed.

As described in the above embodiment 6, it is not necessary to rotate core sheets to align the directions of the tooth end sides. Therefore, for example, it is possible to alternately stack the first core sheets 11 and the second core sheets 21 stamped in the arrangement as shown in FIG. 4 and align them as the core sheet set 40, and also, the device can be placed directly under the die set 51. In a case where the device is placed directly under the die set 51, the pusher 56 may be directly connected with the press machine 50 so that the pusher 56 linearly moves in coordination with stamping operation, whereby it becomes unnecessary to provide an actuator for driving the pusher 56.

In the present embodiment 6, operation can be performed by rotating the rotary disk 55 without rotation of the die 31 serving as a guide as shown in FIG. 13 to FIG. 15 in the above embodiment 3, and thus the rotation load can be reduced and the rotational operation speed can be increased. In the present embodiment 6, instead of the transfer blocks 361, 362 for ejecting and transferring core sheets as shown in FIG. 17 in the above embodiment 4, the rotary disk 55 is used, whereby the directions of the core sheets 11, 12 having different directions can be aligned with each other while the core sheets 11, 21 are retained.

In the above description, the method for aligning two core sheets which are the first core sheet 11 and the second core sheet 21 in one row has been described. However, without limitation thereto, it is possible to align more core sheets in one row at the same time by using the method in the present embodiment 6. For example, in a case of aligning four core sheets in one row, five through holes are arranged at 72-degree intervals in a rotary disk, four guides are connected to the positions of four of the five through holes, a pusher and an exit guide are provided at the position of the other one through hole, the rotary disk is rotated at 72-degree intervals, and the pusher is linearly moved, whereby four core sheets can be aligned in one row.

In the stacked core production method according to embodiment 6 configured as described above, the same effects as in the above embodiments are provided, and in addition, in the alignment step, where a rotary plate rotates about a rotational movement center and has a through hole for storing the first core sheet and the second core sheet by connecting with each of paths for the first core sheets and the second core sheets stamped in the stamping step, in synchronization with the stamping step, the rotary plate rotates by such an angle that the through hole corresponds to each of the paths for the first core sheets and the second core sheets, to store and stack the first core sheet and the second core sheet in the through hole of the rotary plate, and in a state in which the rotary plate is at an angle where the through hole is not connected with the path for the first core sheets and the path for the second core sheets, the stacked first core sheet and second core sheet are ejected from the through hole of the rotary plate, to form the core sheet set.

Thus, the rotation load can be reduced and the rotational operation speed can be increased, whereby productivity is improved.

Further, in the stacked core production method according to embodiment 6, in the alignment step, in a case where the paths for the first core sheets and the second core sheets are in such a positional relationship that the paths coincide with each other when rotationally moving by an angle obtained by dividing 360 degrees by an integer not less than 2, in synchronization with the stamping step, the rotary plate having three or more of the through holes at positions arranged at equal intervals about the center is rotated by an angle obtained by further dividing, by an integer not less than 1, the angle obtained by dividing 360 degrees by the integer not less than 2, to stack the first core sheet and the second core sheet in the through holes of the rotary plate.

Thus, the rotation load can be further reduced, whereby productivity is assuredly improved.

Embodiment 7

In the above embodiments, the case where the stacked core 4 is formed of two kinds of core sheets having different sheet thicknesses, i.e., the first core sheets 11, 12 and the second core sheets 21, 22, has been shown as an example. However, without limitation thereto, a stacked core may be formed of three or more kinds of core sheets having different sheet thicknesses, and this will be described in the present embodiment 7. Except that three or more kinds of core sheets having different sheet thicknesses are used, the other matters are the same as in the above embodiments and therefore the description thereof is omitted as appropriate.

Figure 19:
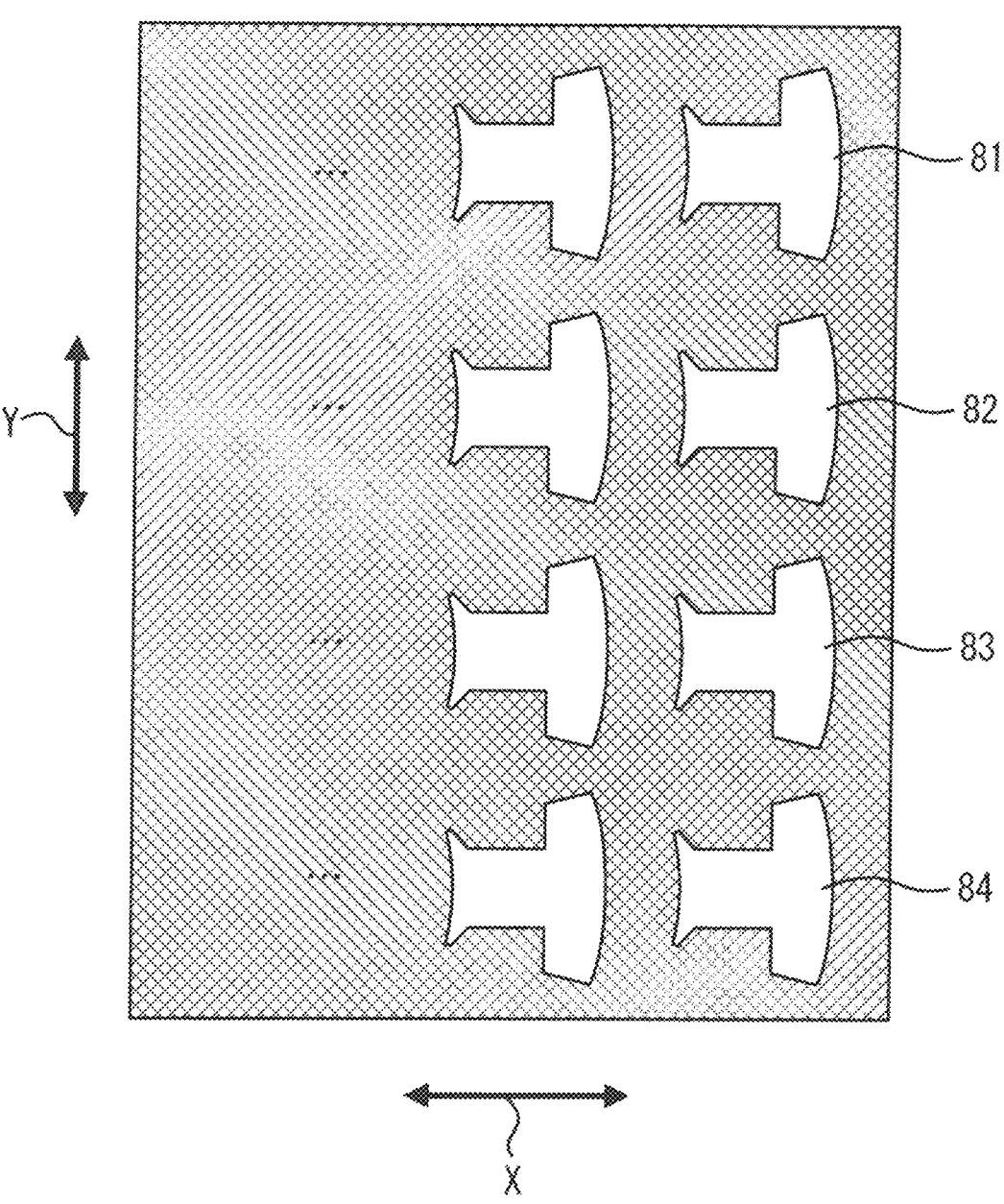
FIG. 19 shows a stacked core production method according to embodiment 7.

As shown in FIG. 19, core sheets are stamped at different positions in the sheet width direction Y on the electromagnetic steel sheet 100. The relationship of the rolling direction X, the sheet width direction Y, and the sheet thickness Z on the electromagnetic steel sheet 100 is the same as in the above embodiments. Here, core sheets are stamped at the same time in four rows at a first position 81, a second position 82, a third position 83, and a fourth position 84 which are different in the sheet width direction Y. Thus, four kinds of core sheets having different sheet thicknesses are formed at the same time. Then, the four kinds of core sheets having different sheet thicknesses are stacked per predetermined number of sheets, to form a stacked core.

By producing the stacked core as described above, unlike the above embodiments, it is possible to stamp many core sheets at the same time, so that the number of sheets produced per time increases, whereby productivity can be improved. In addition, if the profile of the sheet thickness Z is acquired by measuring the sheet thickness Z in the sheet width direction Y in advance, it is possible to select such a combination in the stacking direction of a plurality of kinds of core sheets having different sheet thicknesses that can minimize the sheet thickness deviation of the stacked core when the core sheets are alternately stacked.

Thus, as compared to a case of alternately stacking only two kinds of core sheets, the effect of reducing the sheet thickness deviation is more likely to be obtained, whereby the stacked core 4 to form the rotary electric machine 10 having high efficiency can be produced. Further, the combination for stacking can be changed in accordance with the condition of the sheet thickness of the electromagnetic steel sheet 100 as a material. Therefore, it becomes easy to cope with disturbance such as change in a material lot or change in climate, so that the quality of the produced stacked core 4 is stabilized and productivity is improved.

The stacked core production method configured as described above is a stacked core production method for forming a stacked core by stacking a plurality of core sheets stamped from an electromagnetic steel sheet of which a sheet thickness differs along the sheet width direction, the method including:

a stamping step of stamping a plurality of the core sheets at different positions in the sheet width direction of the electromagnetic steel sheet at the same time, to form a plurality of kinds of the core sheets having different sheet thicknesses;

an alignment step of stacking the plurality of kinds of core sheets in a predetermined order and per predetermined number of sheets, and aligning the stacked core sheets, to form a core sheet set; and a fixation step of fixing the core sheet set in a stacking direction.

Thus, by using a plurality of kinds of core sheets having different sheet thicknesses, it is possible to provide a stacked core, a rotary electric machine, a stacked core production method, and a rotary electric machine production method that enable stable production at low cost.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 rotary electric machine
122 rotor
123 stator
124 frame
100 electromagnetic steel sheet
107 air gap
11 first core sheet
12 first core sheet
21 second core sheet
22 second core sheet
4 stacked core
5 adhesion portion
8 welded portion
9 coil
31 die
32 alignment device
320 alignment device
321 alignment device
331 transportation lane
332 transportation lane
34 alignment lane
351 stopper
352 stopper
361 transfer block
362 transfer block
37 ejection block
38 alignment block
40 core sheet set
50 press machine
51 die set
521 linear guide
522 helical guide
531 first gear
532 second gear
55 rotary disk
551 through hole
552 through hole
553 through hole
554 through hole
56 pusher
571 first guide
572 second guide
573 exit guide
61 first position
62 second position
63 core back side
64 tooth end side
681 entrance
69 combining portion
70 exit
71 first position
72 second position
81 first position
82 second position
83 third position
84 fourth position 91 bending portion
92 overlapping portion
93 alignment portion
O center
T1 stacking direction
T1 axial direction
T2 radial direction
T3 circumferential direction
X rolling direction
Y sheet width direction
Z sheet thickness

The invention claimed is:

1. A stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, the first core sheets and the second core sheets are alternately stacked per predetermined number of sheets, the stacked core has a core back to form an annular shape when a plurality of the core backs are arranged in a circumferential direction, and one tooth protruding in a radial direction from the core back, each first core sheet is formed such that the sheet thickness thereof increases from an end side of the tooth which is the one side toward the core back side which is the other side in the radial direction, and each second core sheet is formed such that the sheet thickness thereof increases from the other side toward the one side in the radial direction.

2. A stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, the first core sheets and the second core sheets are alternately stacked per predetermined number of sheets, the stacked core has a core back to form an annular shape when a plurality of the core backs are arranged in a circumferential direction, and one tooth protruding in a radial direction from the core back, each first core sheet is formed such that the sheet thickness thereof increases from one circumferential-direction end side of the core back which is the one side toward another circumferential-direction end side of the core back which is the other side in the circumferential direction, and each second core sheet is formed such that the sheet thickness thereof increases from the other side toward the one side in the circumferential direction.

3. A rotary electric machine comprising:

a stator formed by arranging, in an annular shape, a plurality of the stacked cores according to claim 1; and a rotor provided so as to be opposed to the stator via an air gap.

4. A stacked core production method for forming the stacked core according to claim 1 by stacking the plurality of core sheets stamped from the electromagnetic steel sheet of which a sheet thickness differs along a sheet width direction, the method comprising:

a stamping step of stamping a plurality of the core sheets at different positions in the sheet width direction of the electromagnetic steel sheet at the same time, to form a plurality of kinds of the core sheets having different sheet thicknesses;

an alignment step of stacking the plurality of kinds of core sheets in a predetermined order and per predetermined number of sheets, and aligning the stacked core sheets, to form a core sheet set; and a fixation step of fixing the core sheet set in a stacking direction.

5. A stacked core production method for forming the stacked core according to claim 2 by stacking the plurality of core sheets stamped from the electromagnetic steel sheet of which a sheet thickness differs along a sheet width direction, the method comprising:

a stamping step of stamping a plurality of the core sheets at different positions in the sheet width direction of the electromagnetic steel sheet at the same time, to form a plurality of kinds of the core sheets having different sheet thicknesses;

an alignment step of stacking the plurality of kinds of core sheets in a predetermined order and per predetermined number of sheets, and aligning the stacked core sheets, to form a core sheet set; and a fixation step of fixing the core sheet set in a stacking direction.

6. A stacked core production method for producing the stacked core according to claim 1, the method comprising:

a stamping step of stamping the first core sheets and the second core sheets from the electromagnetic steel sheet of which the sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, wherein in the stamping step, each first core sheet and each second core sheet are stamped with their respective tooth end sides reversed from each other in the sheet width direction of the electromagnetic steel sheet, or each first core sheet and each second core sheet are stamped with their respective tooth end sides reversed from each other in a rolling direction of the electromagnetic steel sheet.

7. A stacked core production method for producing the stacked core according to claim 2, the method comprising:

a stamping step of stamping the first core sheets and the second core sheets from the electromagnetic steel sheet of which the sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, wherein in the stamping step, each first core sheet and each second core sheet are stamped with their respective tooth end sides reversed from each other in the sheet width direction of the electromagnetic steel sheet, or each first core sheet and each second core sheet are stamped with their respective tooth end sides reversed from each other in a rolling direction of the electromagnetic steel sheet.

8. The stacked core production method according to claim 6, wherein in the alignment step, in synchronization with the stamping step, at least either the first core sheet or the second core sheet is stacked for the predetermined number of sheets, and when the predetermined number of sheets are stacked, rotation is performed by 180 degrees in a horizontal direction and the second core sheet or the first core sheet different from the stacked first core sheet or second core sheet is stacked so as to be aligned, to form the core sheet set.

9. A stacked core production method for producing a stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, and the first core sheets and the second core sheets are alternately stacked per predetermined number of sheets, the method comprises:

a stamping step of stamping the first core sheets and the second core sheets from the electromagnetic steel sheet of which the sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, in the stamping step, each first core sheet and each second core sheet are stamped with their respective tooth end sides reversed from each other in the sheet width direction of the electromagnetic steel sheet, or each first core sheet and each second core sheet are stamped with their respective tooth end sides reversed from each other in a rolling direction of the electromagnetic steel sheet, and in the alignment step, the first core sheets and the second core sheets are put into different entrances, and until reaching an exit where the first core sheets and the second core sheets are merged, directions of the tooth end sides of the first core sheets and the second core sheets are aligned with each other to form the core sheet set.

10. The stacked core production method according to claim 9, wherein in the alignment step, the first core sheets and the second core sheets of which the directions of the tooth end sides are aligned with each other are alternately stacked by a gear, to form the core sheet set.

11. The stacked core production method according to claim 9, wherein in the alignment step, the directions of the tooth end sides of the first core sheets and the second core sheets are aligned with the direction of the tooth end sides of either the first core sheets or the second core sheets stamped in the stamping step, to form the core sheet set.

12. The stacked core production method according to claim 10, wherein in the alignment step, the directions of the tooth end sides of the first core sheets and the second core sheets are aligned with the direction of the tooth end sides of either the first core sheets or the second core sheets stamped in the stamping step, to form the core sheet set.

13. The stacked core production method according to claim 9, wherein in the alignment step, the directions of the tooth end sides of the first core sheets and the second core sheets are aligned with a direction different from the directions of the tooth end sides of the first core sheets and the second core sheets stamped in the stamping step, to form the core sheet set.

14. The stacked core production method according to claim 10, wherein in the alignment step, the directions of the tooth end sides of the first core sheets and the second core sheets are aligned with a direction different from the directions of the tooth end sides of the first core sheets and the second core sheets stamped in the stamping step, to form the core sheet set.

15. A stacked core production method for producing a stacked core formed by stacking a plurality of first core sheets and second core sheets stamped from an electromagnetic steel sheet, wherein each first core sheet is formed such that a sheet thickness thereof increases from one side toward another side, each second core sheet is formed such that a sheet thickness thereof increases from the other side toward the one side, and the first core sheets and the second core sheets are alternately stacked per predetermined number of sheets, the method comprises:

a stamping step of stamping the first core sheets and the second core sheets from the electromagnetic steel sheet of which the sheet thickness differs along a sheet width direction;

an alignment step of forming a core sheet set in which the first core sheets and the second core sheets are alternately stacked per predetermined number of sheets and are aligned; and a fixation step of fixing the core sheet set in a stacking direction, in the stamping step, each first core sheet and each second core sheet are stamped with their respective tooth end sides reversed from each other in the sheet width direction of the electromagnetic steel sheet, or each first core sheet and each second core sheet are stamped with their respective tooth end sides reversed from each other in a rolling direction of the electromagnetic steel sheet, and in the alignment step, where a rotary plate rotates about a rotational movement center and has a through hole for storing the first core sheet and the second core sheet by connecting with each of paths for the first core sheets and the second core sheets stamped in the stamping step, in synchronization with the stamping step, the rotary plate rotates by such an angle that the through hole corresponds to each of the paths for the first core sheets and the second core sheets, to store and stack the first core sheet and the second core sheet in the through hole of the rotary plate, and in a state in which the rotary plate is at an angle where the through hole is not connected with the path for the first core sheets and the path for the second core sheets, the stacked first core sheet and second core sheet are ejected from the through hole of the rotary plate, to form the core sheet set.

16. The stacked core production method according to claim 15, wherein in the alignment step, in a case where the paths for the first core sheets and the second core sheets are in such a positional relationship that the paths coincide with each other when rotationally moving by an angle obtained by dividing 360 degrees by an integer not less than 2, in synchronization with the stamping step, the rotary plate having three or more of the through holes at positions arranged at equal intervals about the center is rotated by an angle obtained by further dividing, by an integer not less than 1, the angle obtained by dividing 360 degrees by the integer not less than 2, to stack the first core sheet and the second core sheet in the through holes of the rotary plate.

17. The stacked core production method according to claim 4, wherein in the fixation step, a part of a side surface along the stacking direction of the core sheet set is adhered by an adhesive, to form an adhesion portion.

18. The stacked core production method according to claim 4, wherein in the fixation step, a part along the stacking direction of the core sheet set is welded to form a welded portion.

19. The stacked core production method according to claim 4, wherein in the fixation step, the core sheet set is fixed by winding a coil around the core sheet set.

20. A rotary electric machine production method comprising:

forming a stator by arranging, in an annular shape, a plurality of the stacked cores produced by the stacked core production method according to claim 4; and providing a rotor so as to be opposed to the stator via an air gap.

\* \* \* \* \*